United States Patent [19]
Vahabzadeh

[11] Patent Number: 5,201,688
[45] Date of Patent: Apr. 13, 1993

[54] TORQUE TRANSMISSION SYSTEM FOR CONNECTING PARALLEL SHAFTS
[75] Inventor: Hamid Vahabzadeh, Oakland, Mich.
[73] Assignee: General Motors Corporation, Detroit, Mich.
[21] Appl. No.: 786,148
[22] Filed: Oct. 31, 1991
[51] Int. Cl.[5] .............................................. F16H 7/08
[52] U.S. Cl. ................................................... 474/111
[58] Field of Search ................. 474/78, 101, 111, 113, 474/133-135

[56] References Cited
U.S. PATENT DOCUMENTS 3,869,138  3/1975  Allison ............................ 474/111 X
5,049,114  9/1991  Hayden ................................ 474/111
5,055,088  10/1991  Cradduck et al. .................... 474/111

Primary Examiner—Thuy M. Bui
Attorney, Agent, or Firm—Donald F. Scherer

[57] ABSTRACT

A torque transmission system for effecting a driving connection between laterally spaced driving and driven shafts. A first wheel is mounted on the driving shaft and a second wheel is mounted on the driven shaft. Each of the wheels have substantially identical pitch diameters. An endless flexible torque transmitter operatively connects the first and second wheels. A traveling insert band circumscribes and operatively engages one of the wheels at a time, and when the traveling insert band engages one of the wheels, the insert band is located radially inwardly of the endless flexible torque transmitter. The traveling insert band has leading and trailing ends located in substantially circumferentially opposed juxtaposition when the traveling insert band operatively engages one of the wheels. Mechanisms are also provided selectively to derail the leading end of the traveling insert band from that wheel operatively engaged thereby. The traveling insert band is adapted, when its leading end is derailed from one of the wheels to travel to the other of the wheels and to circumscribe and operatively engage the other wheel radially inwardly of the endless torque transmitter thereby providing a different speed ratio between said driving and driven shafts.

8 Claims, 17 Drawing Sheets

TORQUE TRANSMISSION SYSTEM FOR CONNECTING PARALLEL SHAFTS

TECHNICAL FIELD

The present invention relates generally to a novel and unique torque transmission system. More particularly, the present invention relates to a torque transmission system utilizing an endless torque transmitting means to effect an operative drive between two torque transfer wheel means mounted, respectively, on laterally spaced, driving and driven shaft means. Specifically, the present invention relates to the use of an insert band means which is selectively movable between the two wheel means, during operation of the transmission, to effect a predetermined change in the operative pitch diameters of the wheel means and thereby provide a two-speed drive ratio between the driving and the driven shafts by selective placement of the insert band means about one or the other of the wheel means.

BACKGROUND OF THE INVENTION

Torque transmission systems which interconnect a drive shaft to a parallel, driven shaft conventionally employ chain or belt torque transfer systems which operatively connect the parallel shafts, each of which has a sprocket or pulley of different pitch diameter to produce a fixed-speed drive ratio therebetween. To provide even a two-speed drive ratio between such shafts has historically required a rather complex arrangement of gears and torque transfer devices, the latter generally comprising clutches and/or brakes. To change the speed of the drive ratios with the prior known arrangements has required shift clutches and intermeshing gears with bearings and rotating components, each of which contribute to losses in overall efficiency.

Another somewhat less expensive but no less technically complex arrangement has employed multiple sprockets on each shaft. In that arrangement, the sprockets on one shaft are each aligned with sprockets on the other shaft, and a chain drive selectively interconnects the aligned pairs of sprockets. A derailleur selectively transfers engagement of the chain drive between the aligned pairs of sprockets so that the drive ratios can be selected between those provided by the pairs of aligned sprockets.

Because of the costs to manufacture and maintain, the prior art arrangements as well as the need to remove the load during the shift, many parallel shaft installations are simply provided with a fixed-speed drive ratio. Such a fixed-speed drive ratio provides a weighted average or compromise between the highest and lowest drive ratios desired for a particular installation. In short, the prior known structural arrangements which provide selective drive ratios are overly sophisticated and overly expensive to be employed in many torque transmission systems for which they are desired, and for which they would be beneficial, were it not for the overall costs and complexity of the structures heretofore available for providing selective drive ratios.

SUMMARY OF THE INVENTION

It is, therefore, a primary object of the present invention to provide a novel and unique torque transmission system which is selectively changeable between at least two predetermined drive ratios without interrupting torque transfer, even during the shift.

It is another object of the present invention to provide a novel torque transmission system, as above, in which there are minimal efficiency losses during the shift between drive ratios.

It is a further object of the present invention to provide a novel torque transmission system, as above, which provides a two-speed drive ratio but which may be cascaded to multiply the speeds available from the drive ratios or which may be employed in conjunction with a multispeed transmission to double the drive ratios provided thereby.

It is yet another object of the present invention to provide a novel torque transmission system, as above, which is adapted to be substituted for any installation wherein a chain or belt drive connects two parallel shafts.

These and other objects of the invention, as well as the advantages thereof over existing and prior art forms, which will be apparent in view of the following detailed specification, are accomplished by means hereinafter described and claimed.

In general, a torque transmission system embodying the concepts of the present invention is adapted to be operatively interconnected between a pair of laterally spaced parallel shafts. A wheel means is mounted on each shaft, and the wheel means are of identical pitch diameter. An endless flexible torque transmitting means operatively connects the two wheel means.

A traveling insert band means selectively circumscribes one or the other of the wheel means radially inwardly of the endless flexible torque transmitting means. The traveling insert band means has free leading and trailing ends which are normally disposed in circumferential opposition when the traveling insert band means circumscribes either of the wheel means. The traveling insert band means is adapted, when its leading end is disengaged from the wheel means on which the traveling insert band means is received, to travel to the other wheel means and progressively circumscribe that wheel means, thereby effecting a progressive change in the pitch diameters of each wheel means in order to provide a concomitant preselected change in the drive ratio between the two parallel rotating shafts.

Two exemplary embodiments of the present torque transmission system are described herein, and those two embodiments are deemed sufficient to effect a full disclosure of the subject invention. The exemplary torque transmission systems are described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
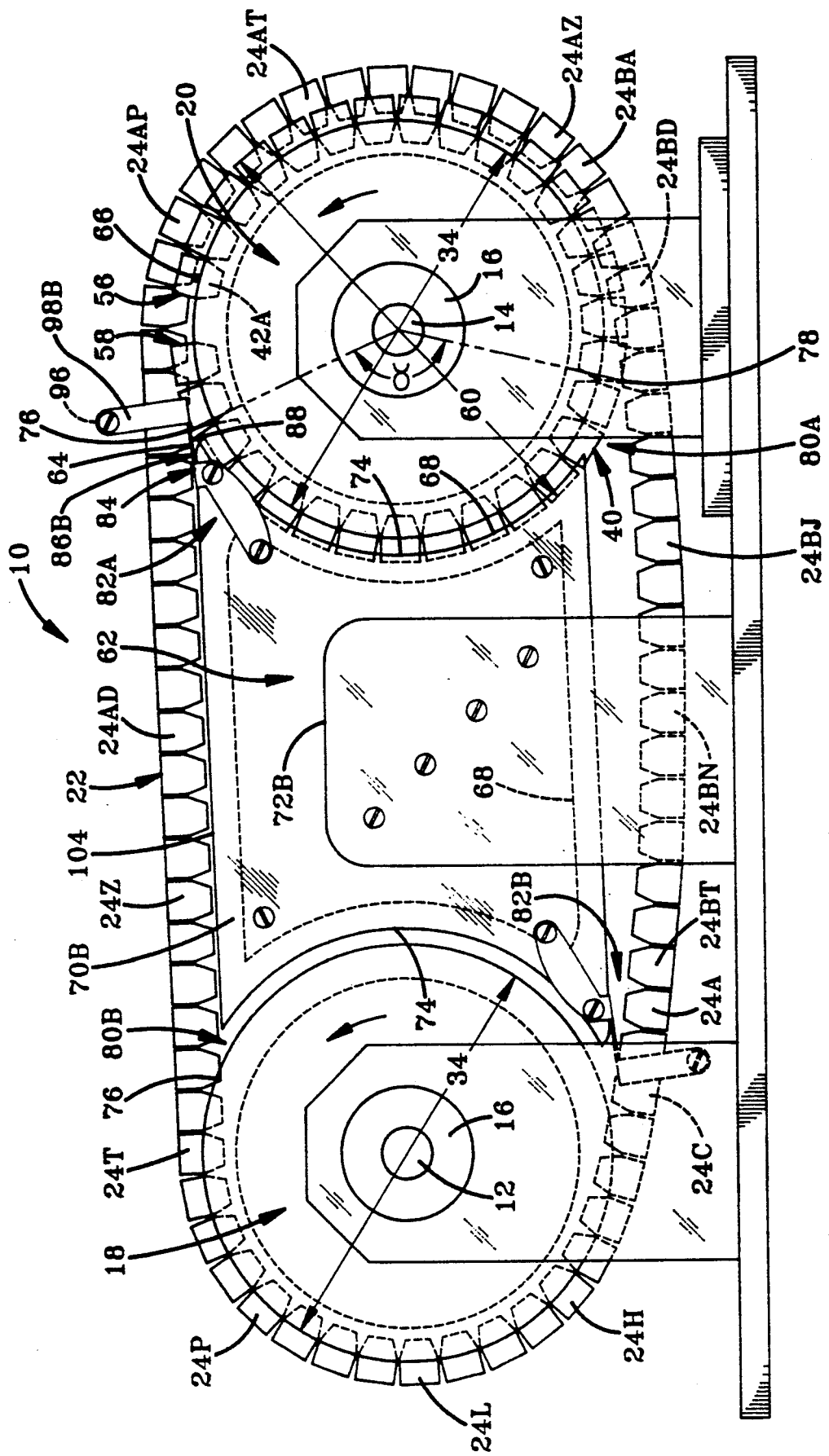
FIG. 1 is a schematic side elevation of a torque transmission system embodying the concepts of the present invention, and depicting the insert band in the form of a V-belt which is circumscribing a wheel means in the nature of a pulley on the driven shaft to provide the maximum underdrive gear ratio.

One representative form of a torque transmission system embodying the concepts of the present invention is designated generally by the numeral 10 on the accompanying drawings. As shown in FIGS. 1 through 9, the representative torque transmission system 10 is employed to effect a driving connection between two parallel shafts 12 and 14 which may, for purposes of the description which follows, be arbitrarily designated as the driving and the driven shafts, respectively. Each shaft 12 and 14 may be mounted for rotation in a bearing assembly 16 that is, itself, suitably supported for the environment in which the system 10 is to be employed. Torque transfer wheel means are mounted on each of the shafts 12 and 14, and in the embodiment depicted in FIGS. 1 through 9, the torque transfer wheel means may each be peripherally grooved pulleys, or sheaves 18 and 20 operatively secured to the respective shafts 12 and 14.

An endless, flexible torque transmitting means operatively connects the wheel means 18 and 20. In the embodiment depicted in FIGS. 1 through 9, the endless flexible torque transmitting means may comprise a V-belt means 22 which may be a single integral arrangement commonly designated as a belt or, as depicted, the endless torque transmitting means may comprise a series of links 24 which are pivotally interconnected, as by a living hinge in the nature of a central core 26 (FIG. 9). In either event, the V-belt means 22 presents lateral faces 28 and 30 which converge to provide the taper required to engage the radially inwardly tapered groove 32 which extends circumferentially about the periphery of each pulley 18 and 20, and which opens radially outwardly to receive the V-belt means 22.

Each of the pulleys 18 and 20 have the same pitch diameter 34 (FIG. 1). The length of the V-belt means 22, together with the lateral spacing of the driving and driven shafts 12 and 14, are such as to force the tapered lateral faces 28 and 30 on the V-belt means 22 into driving engagement with the tapered side walls 36 and 38 which form the groove 32 in the outer periphery of one pulley 18 or 20 when a traveling insert band 40 operatively engages the other pulley 20 or 18.

In the embodiment presently being described, the traveling insert band 40 is depicted as being comprised of a plurality of link means 42 which may be similarly connected by a central core 44 (FIG. 9) to permit the insert band 40 to flex, as required when encapsulated between the flexible torque transmitting member; i.e., the V-belt means 22, and the respective pulleys 18 or 20. Each link means 42 presents tapered faces 46 and 48 along the lateral sides thereof so that the traveling insert band 40 will be able to effect a frictional driving connection with the tapered, circumferential groove 32 in either pulley 18 and 20.

For convenience in designating relative locations on the V-belt means 22, as well as on the traveling insert band 40, and inasmuch as the tapered groove 32 opens radially outwardly of the pulleys 18 and 20, the tapered faces 28 and 30 on the V-belt means 22 and the tapered faces 46 and 48 on the traveling insert band 40—both of which are adapted to drivingly to engage the side walls 36 and 38 of the tapered groove 32—will be designated as being on the radially inner side of the V-belt means 22 and the radially inner side of the traveling insert band 40, respectively.

With the tapered faces 46 and 48 having been defined as being disposed along the lateral sides on the radially inner portion of the traveling insert band 40, it will be understood that the radially outer side of the insert band 40 presents a groove 50 which extends the full length of the insert band 40. The groove 50 has tapered side walls 52 and 54 which preferably duplicate the side walls 36 and 38 of the groove 32. In that way the converging lateral faces 28 and 30 on the V-belt means 22 can also effect a frictional driving connection with the groove 50 in the insert band 40, when the insert band 40 is received, either in whole or in part, within the groove 32 in either pulley 18 or 20.

When the insert band 40 circumscribes either pulley 18 or 20, the leading end 56 of the insert band 40 is preferably disposed in circumferential opposition with the trailing end 58 of the insert band 40. In that way, the V-belt means 22 will be fully supported by the insert band 40 as the pulley 18 or 20 about which the band 40 is received is rotated. As shown in FIG. 1, the insert band 40 is wrapped about the circumference of pulley 20. With the insert band 40 so disposed about the pulley 20, the effective pitch diameter 60 of the pulley 20 is greater than the pitch diameter 34 of the pulley 18, and with the shaft 12 having been designated as the driving shaft, the arrangement depicted in FIG. 1 represents the configuration which provides the maximum underdrive ratio.

The depth of the groove 50 in the insert band 40 is preferably such that when the flexible torque transmitting device or V-belt means 22 is received within the groove 50 the effective pitch diameter 60 of the pulley 18 or 20, as increased by the thickness of the insert band 40, will be coincident with the locus defined by the central core or living hinge 26 of the V-belt means 22 in order to preclude forced relative movement between the V-belt means 22 and the insert band 40.

In order to maintain the insert band 40 in operative, peripheral engagement with the pulley 20, a containment means 62 is provided. In the embodiment of the torque transmission system now being described, the containment means 62 must act in concert with the link 42A which presents the leading end 56 of the insert band 40 to maintain the insert band 40 in operative engagement with whichever of the pulleys about which it is received, and an ejector surface 64 associated with the containment means 62 (and comprising one component surface of the hereinafter described gate means 84) must permit or effect selective disengagement of the leading end 56 from the pulley 20.

As may already have been observed, and as will appear in the description which follows, a particular structural member, component or arrangement may be employed at more than one location. When referring generally to that type of structural member, component or arrangement, a common numerical designation shall be employed. However, when one of the structural members, components or arrangements so identified is to be individually designated, it shall be referenced by virtue of a letter suffix employed in combination with the numerical designator employed for general identification of that structural member, component or arrangement. Thus, there are at least two links in the insert band 40 which are generally identified by the numeral 42, but the specific individual links are, therefore, identified as 42A, 42B, etc., in the specification and on the drawings. This same suffix convention shall be employed throughout the specification.

One operative form of a containment means 62 is depicted in FIGS. 1 through 9 as operatively interactive with a reaction pin 66 which extends transversely through that link 42A of the traveling insert band 40 which presents the leading end 56 thereof. The containment means 62 is supported from a central frame block 68 sandwiched between side plates 70, and that assemblage is, in turn, supported by a pair of laterally spaced frame posts 72. The arcuate end or blocking surfaces 74 on the side plates cooperate with the reaction pin 66 to retain the insert band 40 on one or the other of the wheel means 18 or 20. As such, the arcuate blocking surfaces 74 each extend along the major portion of that arc defined by the angle alpha between the respective transition points 76 and 78 where the V-belt means 22 engages with and disengages from the pulleys 18 and 20—or, where the V-belt means 22 engages with or disengages from the insert band 40 as it circumscribes either pulley 18 or 20. The arcuate blocking surfaces 74 may themselves, therefore, define an arc which is located concentrically and relatively closely outwardly of the arc described by the reaction pin 66 as it travels with the insert band 40 during the time that the insert band 40 is rotating with the pulley 20, as shown in FIG. 1.

Figure 2:
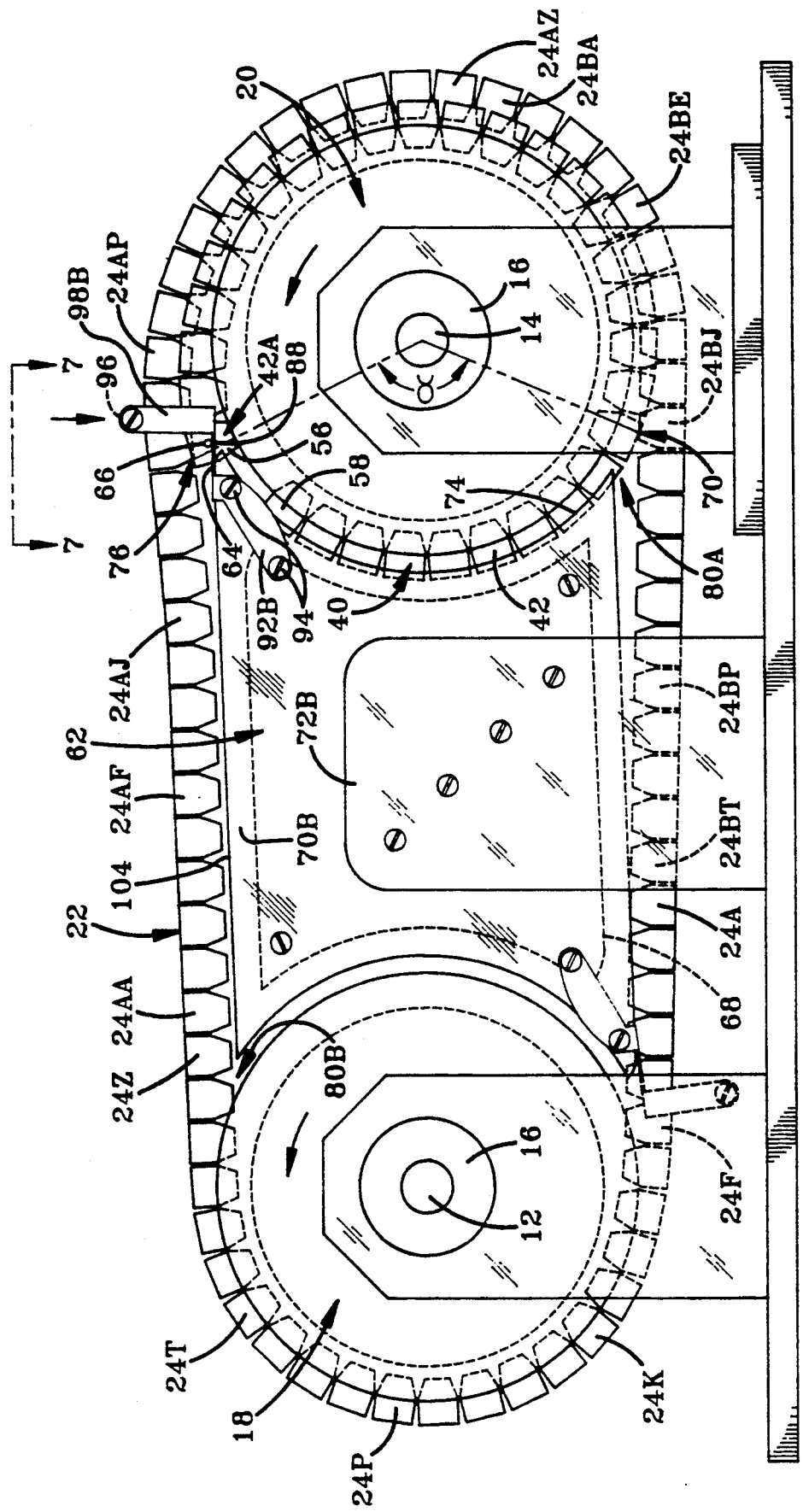
FIG. 2 is a schematic side elevation similar to FIG. 1, but depicting the system at the initiation of the derailing mode whereby the leading end of the insert band is being directed away from the wheel means on the drive shaft.
Figure 6:
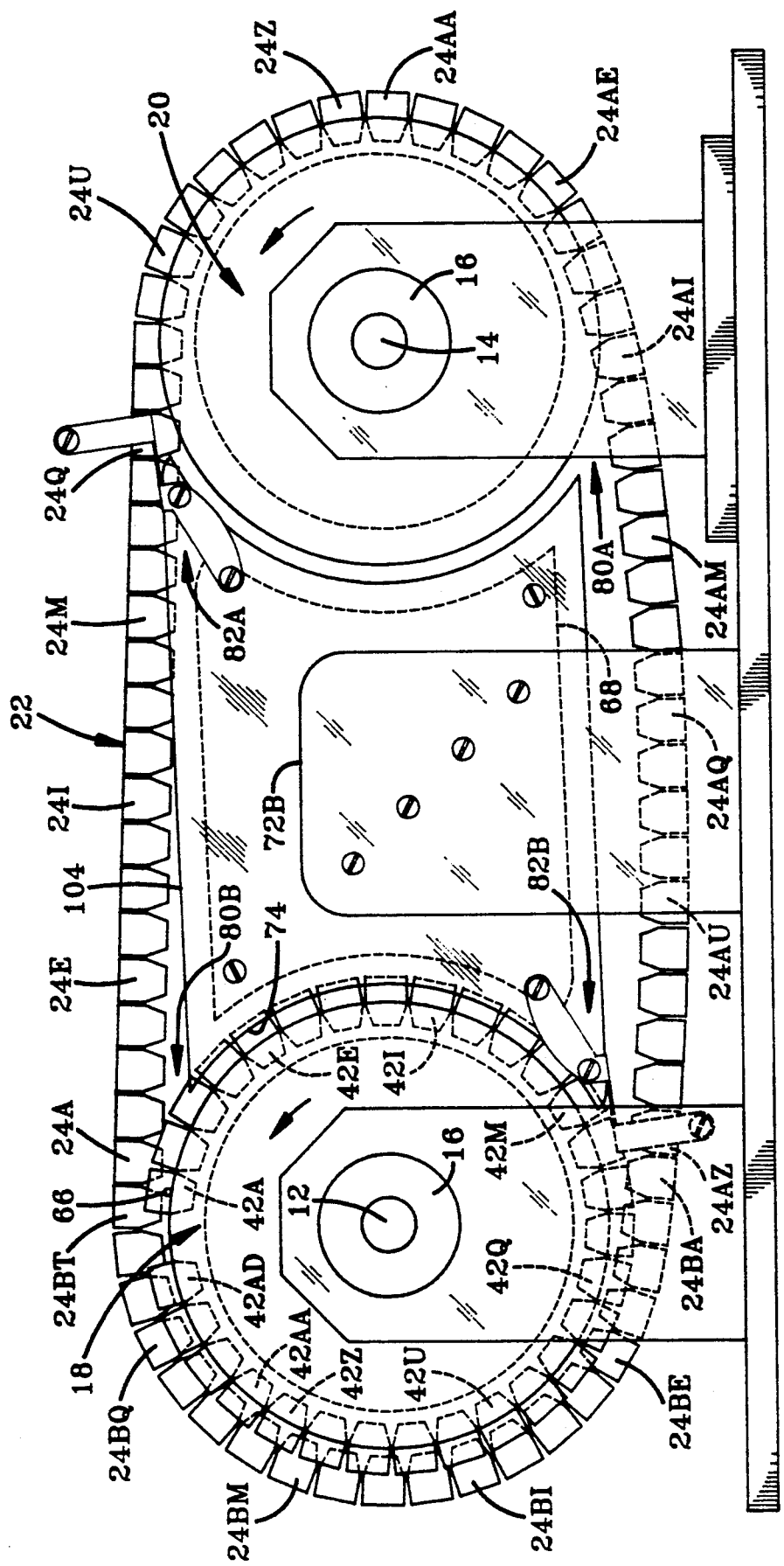
FIG. 6 is a schematic side elevation similar to FIG. 5, but depicting the insert band fully circumscribing the wheel means on the driving shaft to provide the maximum overdrive arrangement.

There must, however, be some open spans between the blocking edge 74 and the transition points 76 and 78 in order to permit free ingress of the reaction pin 66 and selective egress thereof. As shown in FIG. 1, the ingress spans 80 remain continuously open, but the egress spans 82 are each provided with a gate means 84. The gate means 84 is preferably movable between a blocking mode (FIG. 1) and a derailing mode (FIG. 2). In the blocking mode the gate means 84 serves to close the egress span 82 in order to contain the insert band 40 on the pulley—pulley 20 as represented in FIG. 2, but pulley 18 as represented in FIG. 6. As such, the gate means 84 presents a blocking surface 88 that forms an extension of and substantially aligns with the arcuate blocking surface 74 when the gate means 84 is in the blocking mode.

Figure 7:
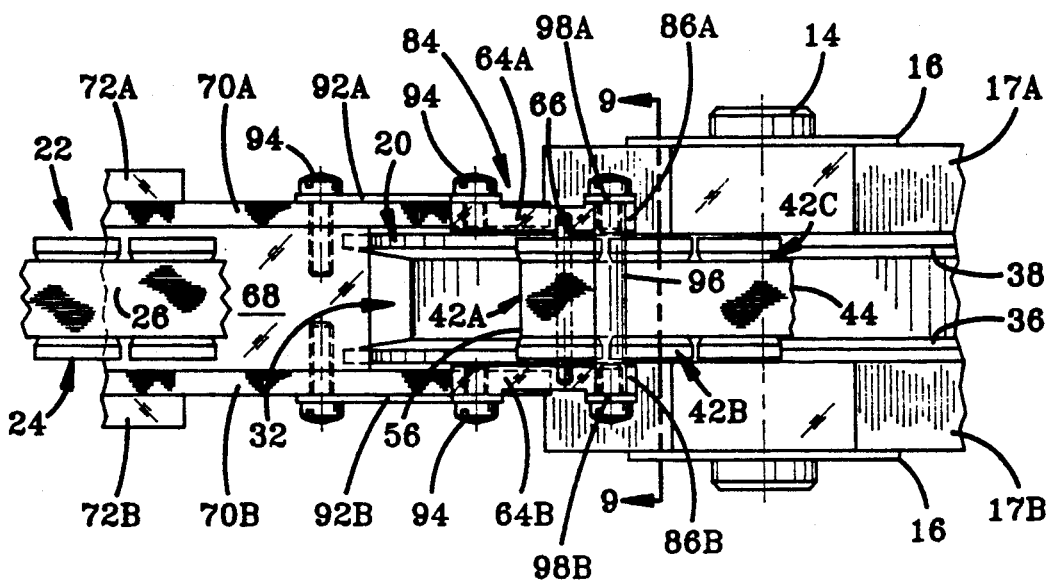
FIG. 7 is an enlarged top plan taken substantially along line 7—7 of FIG. 2 depicting the interaction between the gate means and the reaction pin during initiation of a shift.
Figure 8:
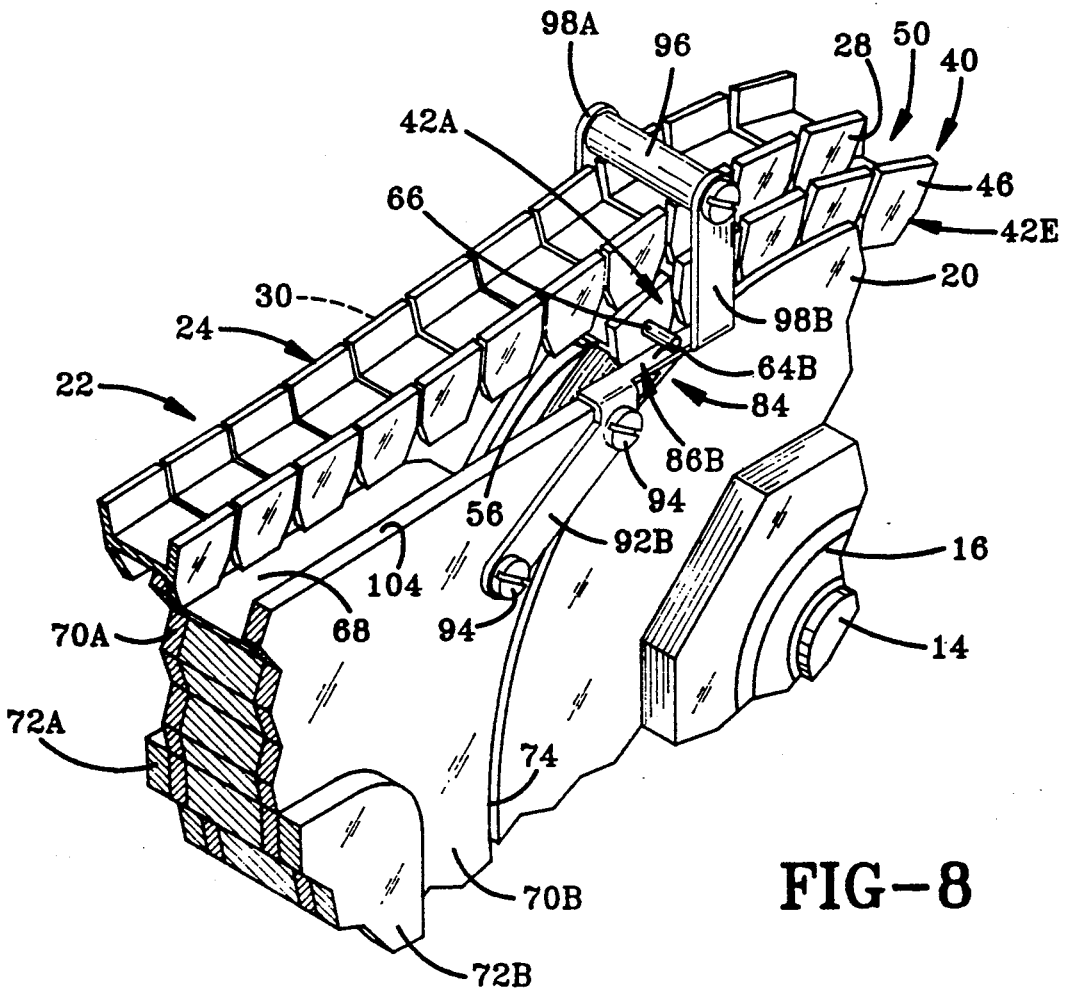
FIG. 8 is a perspective view of the mechanism depicted in top plan in FIG. 7.
Figure 9:
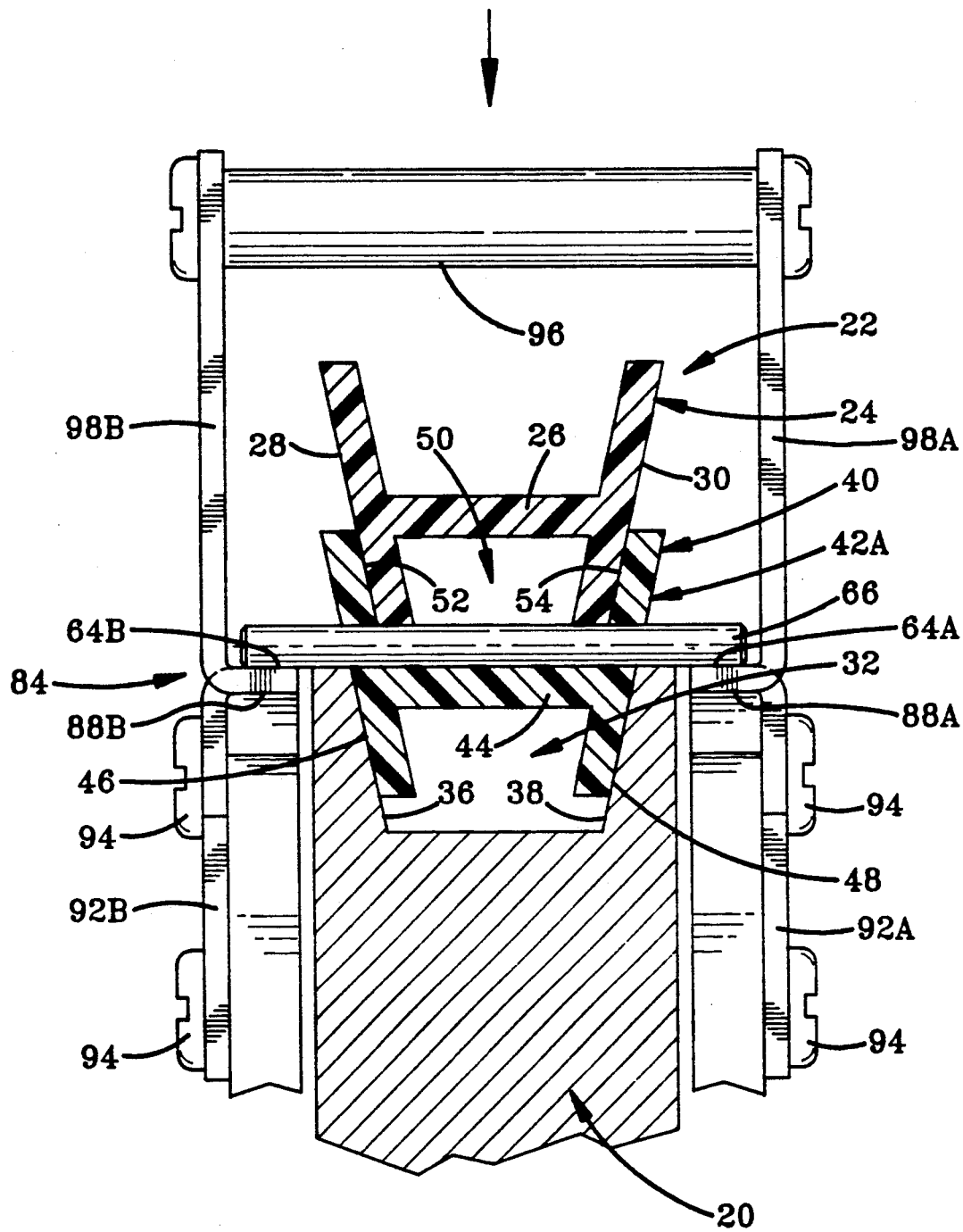
FIG. 9 is a transverse cross section taken substantially along line 8—8 of FIG. 7.

For perhaps the clearest representation of both the ejector surfaces 64 and the blocking surfaces 88 presented from the gate means 84 one may refer to FIGS. 7 and 8. As best seen in those figures, the gate means 84 may present a pair of laterally spaced bridge members 86 which extend outwardly from individual base portions in the configuration of lateral support arms 92 that are secured, as by screws 94, to the side plates 70 and the central frame block 68.

The bridge members 86 extend across the egress spans 82, such that in the blocking mode, the under or blocking surface 88 on each bridge member 86 is disposed in spaced opposition to the wheel means 18 or 20 about which the insert band 40 is received so that it will be disposed to prevent the reaction pin 66, and thus the leading end 56 of the insert band 40, from moving radially outwardly, as is necessary for the insert band 40 to enter and pass outwardly through the egress span 82.

It is immaterial whether the blocking mode is achieved by engagement of the blocking surfaces 74 and 88 with the reaction pin 66, as shown, or the links 42 themselves. Once one understands the general operative concepts of the present invention, it may be tailored to a specific environment without the necessity of embodying all the details of either or both the representative embodiments described herein.

Should it be desired to effect an overdrive with the transmission system 10, provision must be made to move the insert band 40 from its circumferential disposition about pulley 20 (FIG. 1) to a disposition where it circumscribes pulley 18 (FIG. 6). This movement cannot be effected until the insert band is permitted to unwrap from pulley 20, and that result may be achieved by moving the gate means 84 to its derailing mode, as shown in FIG. 2 and 7 through 9. When positioned in the derailing mode, the bridge members 86 of the gate means 84 are pivoted or flexed, as shown, by the application of a force to a shift pin 96 which extends transversely between the upturned actuating arms 98A and 98B provided at the distal ends of each bridge member 86A and 86B.

The force applied to the shift pin 96 displaces the distal or outboard end portions of the bridge members 86 radially inwardly so that the ejector surface 64 on the bridge members 86; i.e., that surface which faces away from the wheel means 18 or 20 about which the insert band 40 is operatively received, will be engaged by the reaction pin 66 which thereupon slides along the ejector surface 64 to direct the leading end 56 of the insert band 40 through the egress span 82A. A variation in the operation of the derailing mode will be explained in conjunction with the alternative embodiment of the invention hereinafter described.

Continuing with a description of the present embodiment, the interaction between the reaction pin 66 and the ejector surface 64 on the gate means 84 in the derailing mode causes the leading end 56 to move in the same general direction as the V-belt means 22, but the insert band 40 will be confined to a path having predetermined limits. That is, the presence of the V-belt means 22 will prevent the insert band 40 from moving radially outwardly beyond the V-belt means 22.

Side plates 70A and 70B may be employed to prevent the leading end 56 from moving laterally outwardly of the plane defined by the V-belt means 22, and the generally linear edges 104 on the side plates 70 serve as a track means which directs the insert band 40 and which prevents the leading end 56 from moving radially inwardly of the V-belt means 22 to an undesirable extent.

Figure 3:
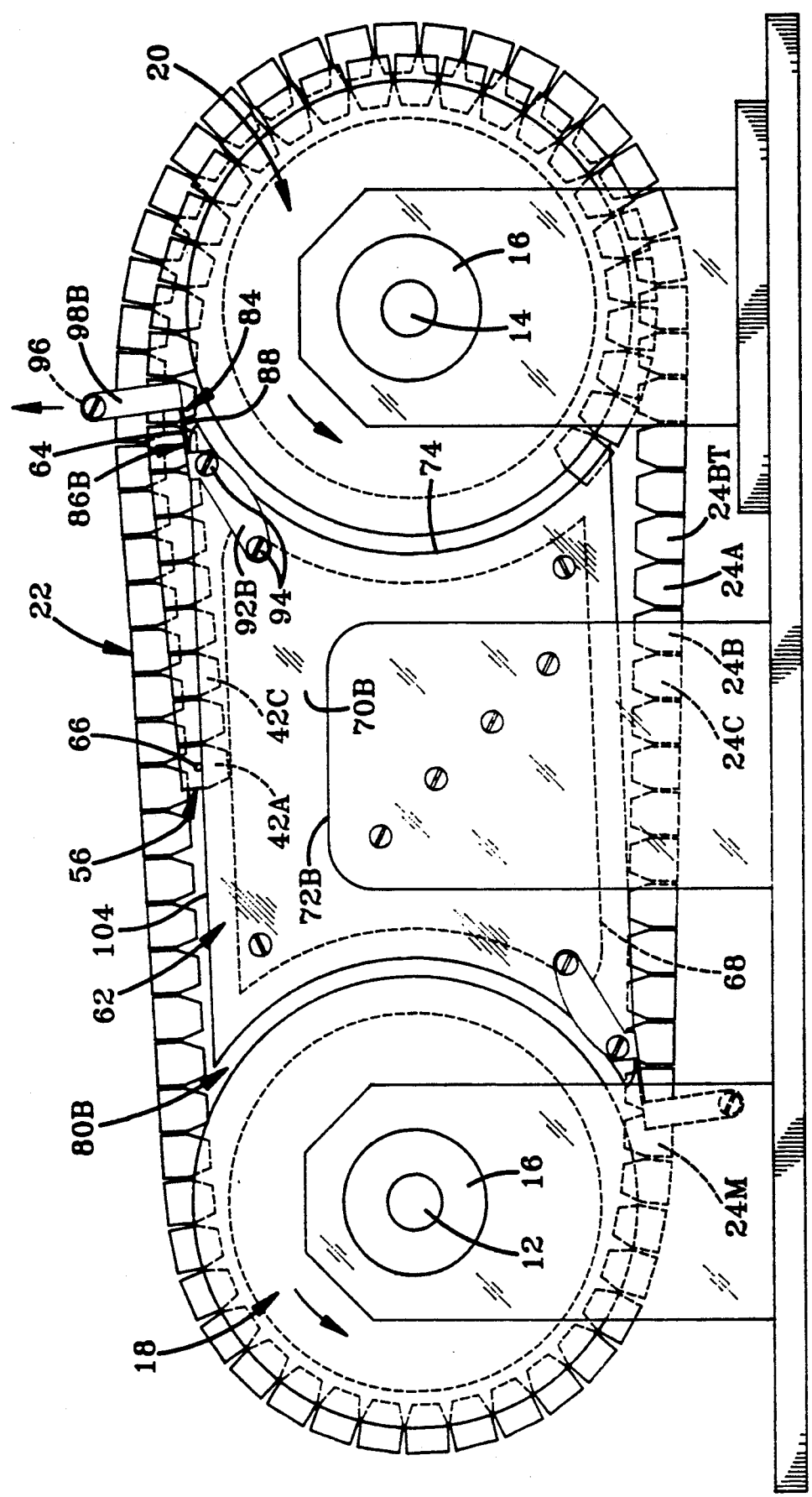
FIG. 3 is a schematic side elevation similar to FIG. 2, but depicting the leading end of the insert band fully disengaged from the wheel means on the driven shaft and traveling towards the wheel means on the driving shaft.

So confined by the V-belt means 22 and the track means formed by the edges 104 of the side plates 70, the leading end 56 of the insert band 40 will travel toward and through the ingress span 80B associated with the pulley 18, as depicted by the sequential representation of FIGS. 2 and 3.

Figure 4:
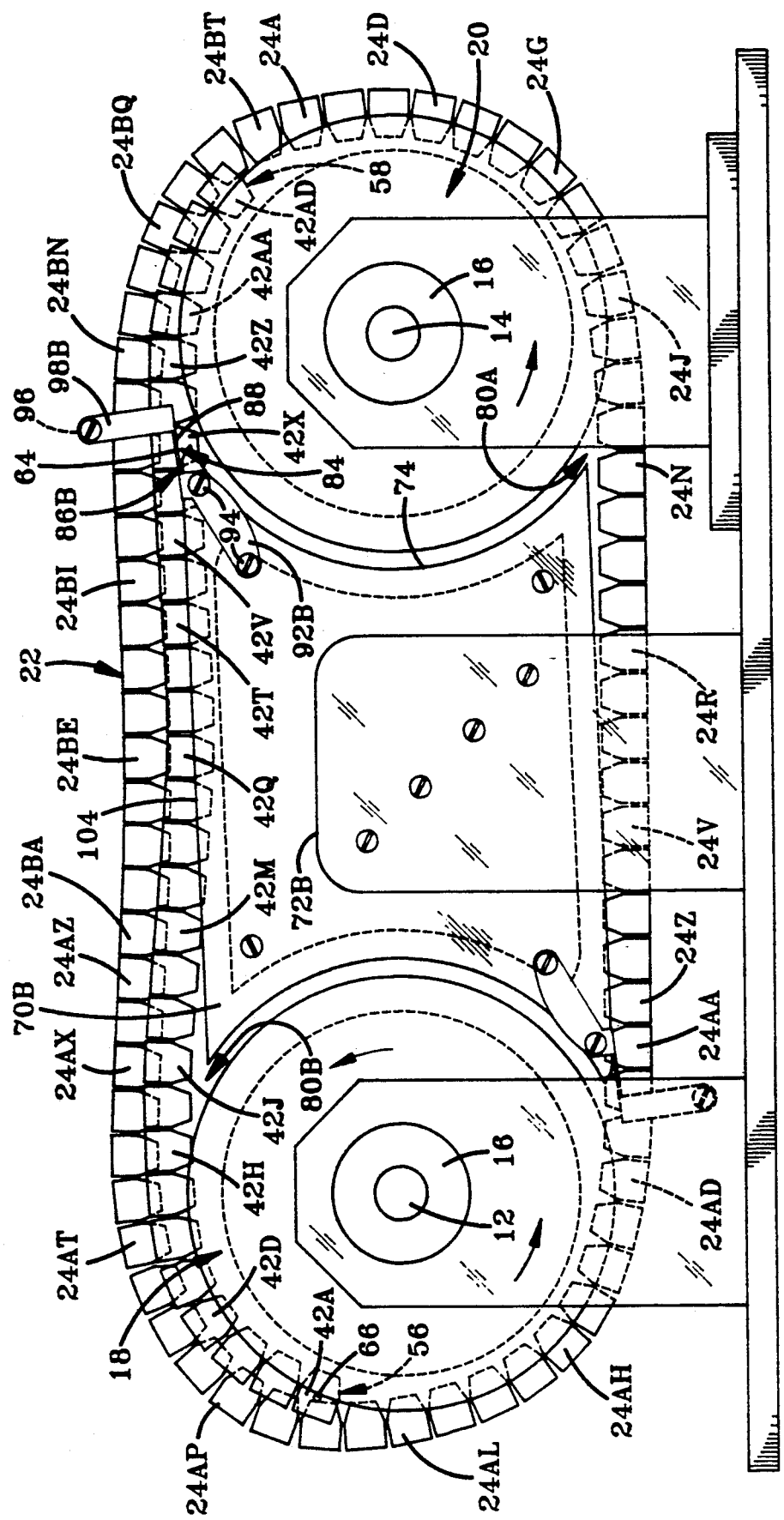
FIG. 4 is a schematic side elevation similar to FIG. 3, but depicting the insert band engaging a portion of the wheel means on both the driving and the driven shafts, as it is in the midst of a shift.

By virtue of astutely selecting the diameter of the wheel means 18 and 20 in relation to the lateral spacing of the driving and driven shafts 12 and 14, respectively, as the insert band 40 moves from the position depicted in FIG. 3 to that depicted in FIG. 4, the drive ratios progressively change from the maximum underdrive ratio to a 1:1 ratio. That is, as the trailing end 58 of the insert band 40 moves to the disposition depicted in FIG. 4, links 24A through 24K of the V-belt means 22 sequentially engage the groove 32B of the wheel means 20 progressively to decrease the effective pitch diameter of the wheel means 20. Simultaneously, the links 42A through 42G of the insert band means 40 are sequentially interposed between the wheel means 18 and the V-belt means 22 progressively to increase the effective pitch diameter of wheel means 18.

Figure 5:
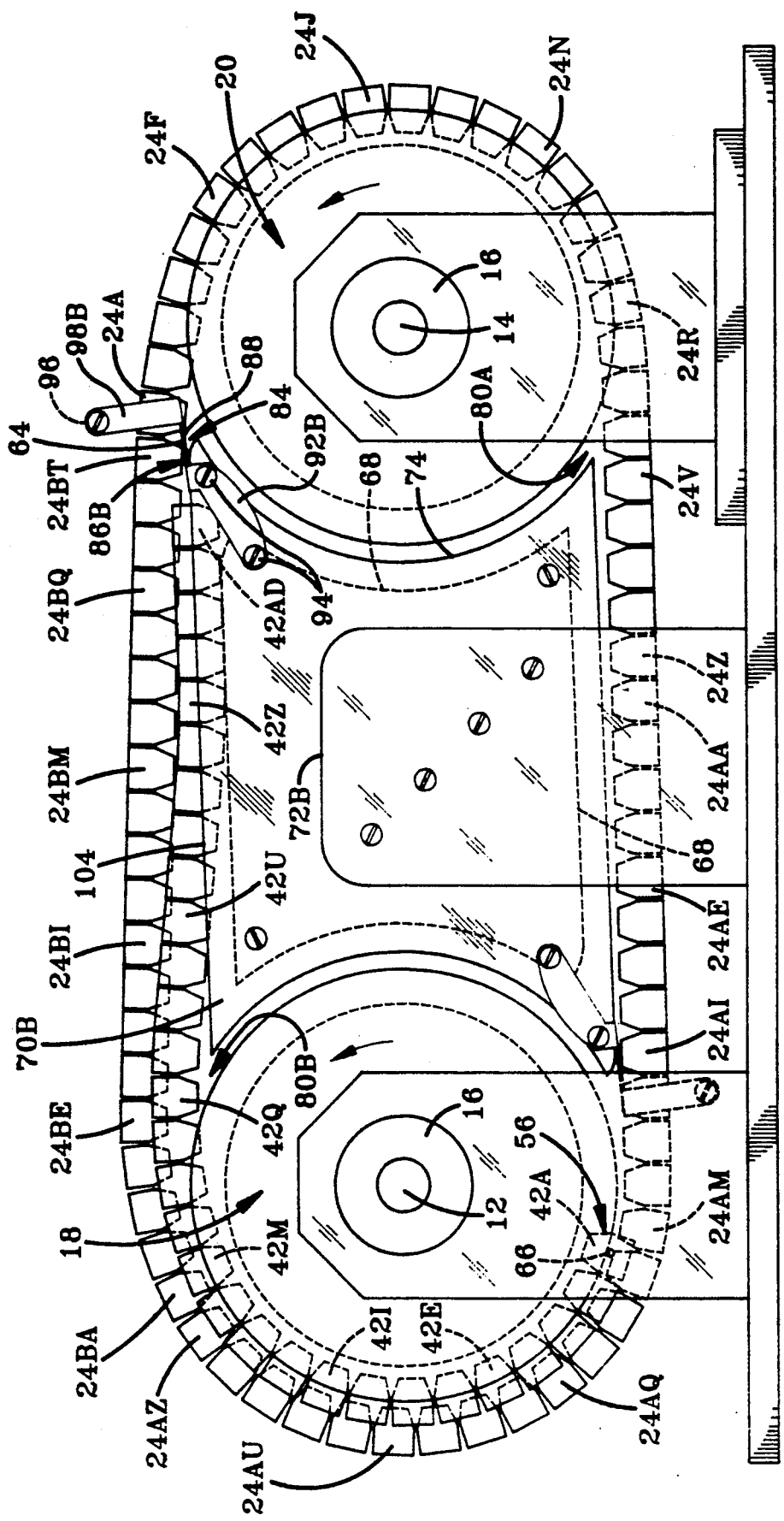
FIG. 5 is a schematic side elevation similar to FIG. 4, but depicting the insert band engaging a substantial portion of the wheel means on the driven shaft, as it is when the shift is substantially completed.

Between the disposition of the components represented in FIGS. 4 and 5, links 42H through 42O on the insert band 40 become interposed between the pulley means 18 and the V-belt means 22 to increase the effective pitch diameter of the pulley means 18 to its substantially maximum value while the links 42Y through 42AD, which leave pulley means 20, reduce the effective pitch diameter of the pulley means 20 to its substantially minimum value. This transition similarly accomplishes a progressive change in the drive ratio from the 1:1 ratio achieved by the disposition of the components depicted in FIG. 3 to the maximum overdrive ratio achieved by the disposition of the components depicted in FIG. 5. The continued interpositioning of the insert band 40 between the pulley means 18 and the V-belt means 22 completes the wrap of the insert band means 40 about the pulley means 18 so that the maximum overdrive ratio is maintained for so long as desired.

To return to the maximum underdrive ratio, the process previously described is followed to derail the insert band 40 from pulley 18 so that it will travel to, and wrap around, pulley means 20.

An alternative embodiment of a torque transmission system which embodies the concepts of the present invention is identified in FIGS. 10 through 21 by the numeral 211. The system 211 is employed to effect a driving connection between two parallel shafts 213 and 215 which are identified as the driving and the driven shafts, respectively. Each shaft 213 and 215 may also be mounted for rotation on a bearing assembly 217. Torque transfer wheel means are mounted on each of the shafts 213 and 215, and in the embodiment depicted in FIGS. 10–21, the wheel means may comprise sprockets 219 and 221 which are operatively secured to the respective shafts 213 and 215.

Figure 14:
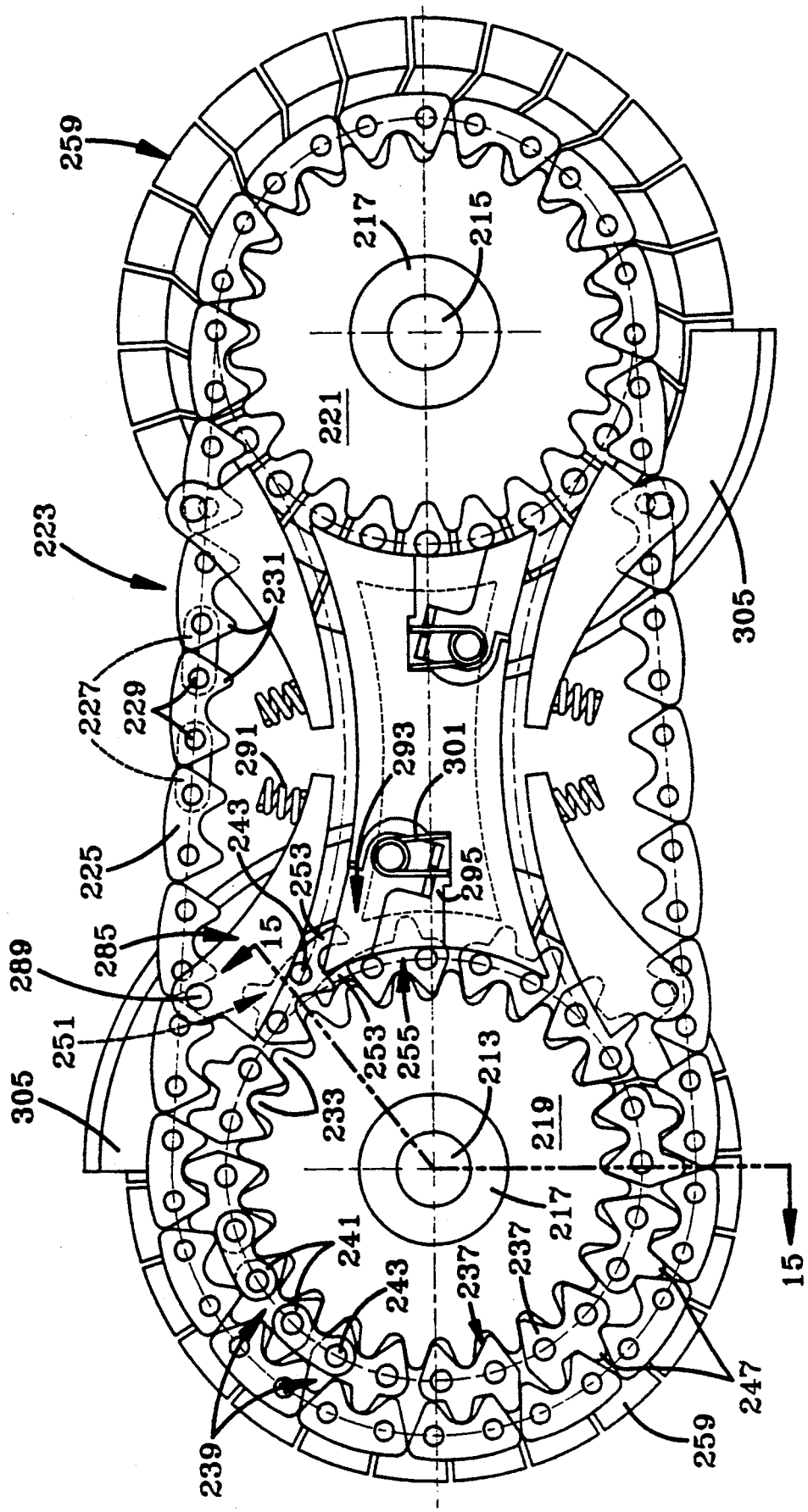
FIG. 14 is a further schematic similar to FIG. 11, but depicting the components in greater detail, both the traveling chain and the endless flexible torque transmitting means in the nature of a chain being depicted in side elevation.
Figure 18:
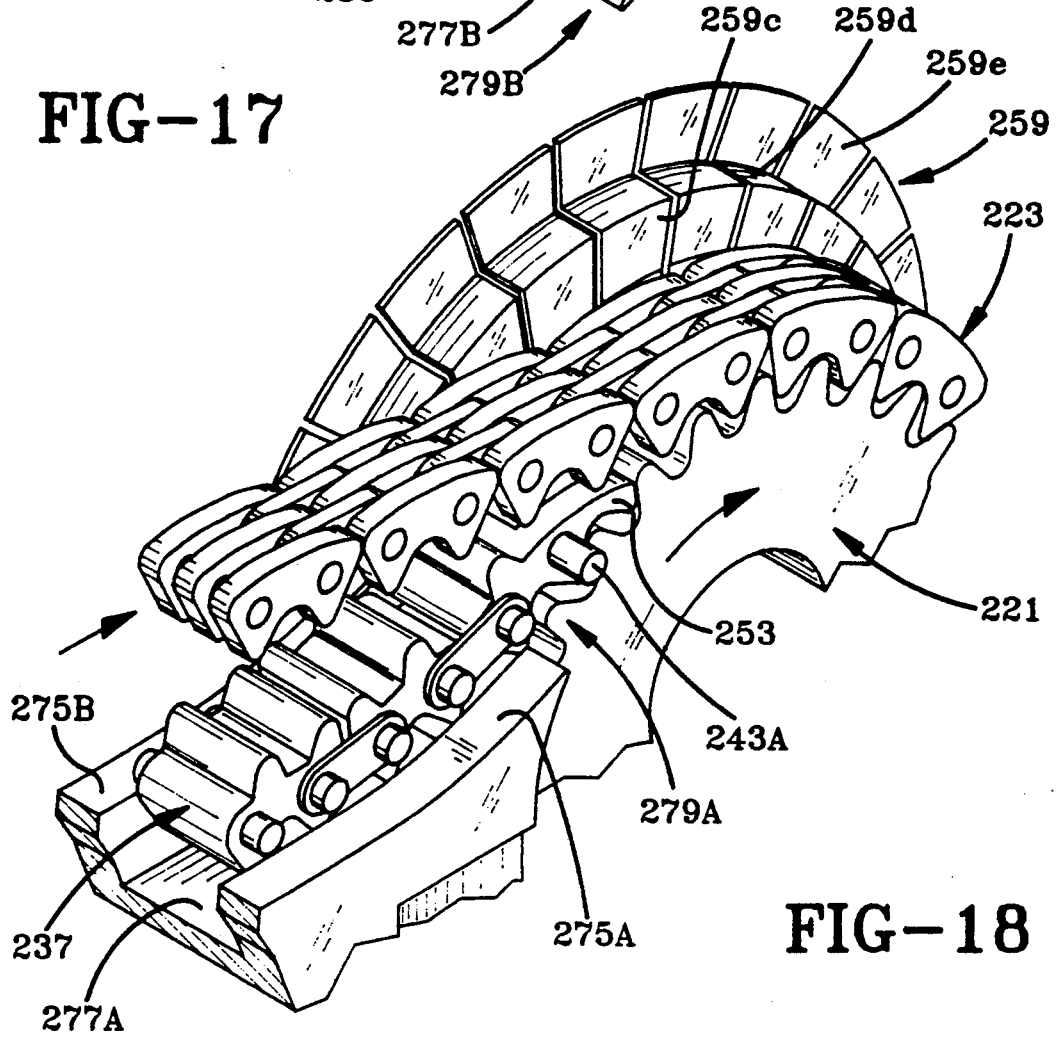
FIG. 18 is a perspective view similar to FIG. 17, but depicting the insertion of the tongue on the leading end block between the sprocket and the endless drive chain.

In the embodiment described, the sprockets also have the same pitch diameter 235 and are connected by an endless, flexible torque transmitting means 223 (FIG. 14) which may be a conventional silent drive chain which meshes with the teeth 233 on each sprocket 219 and 221. That is, and as best seen in FIGS. 14 and 18, the endless drive chain 223 may be comprised of a plurality of toothed links 225 conjoined by connecting links 227 and connecting pins 229. In order to minimize the complexity of the drawings, only two representative connecting links are depicted in FIG. 14.

It should also be understood that the toothed links 225 may be fashioned from solid blocks attached by a pair of external connecting links (not shown), or as shown, the drive chain 223 may comprise stacked toothed and connecting links, as is customarily employed in the typical silent chain configuration. In either arrangement, each toothed link 225 presents a pair of teeth 231 which have a pitch dimension determined by the length of the toothed links 225 taken in conjunction with the length of the connecting links 227 so that the teeth 231 will mesh with the teeth 233 on each sprocket 219 and 221.

An insert band means in the nature of a traveling chain 237 (FIG. 11) is comprised of a plurality of unique insert load transfer blocks 239 which cooperatively interact with the teeth 233 on each sprocket 219 and 221, as well as with the teeth 231 (FIG. 14) on the endless drive chain 223. The thickness of the load transfer blocks 239 increases the effective pitch diameter from that which is designated by the numeral 235 in FIG. 10 to that which is designated by the numeral 245 in FIG. 11 of whichever sprocket 219 or 221 is circumscribed by the traveling chain 237—the thickness of the load transfer blocks 239 being measured radially with respect to the sprocket about which the traveling chain 237 is circumscribed.

The successive insert load transfer blocks 239 are conjoined by connector links 241, laterally spaced pairs of which embrace a portion of the lateral sides on two successive blocks and are pivotally attached to each block by pins 243. It will be observed that only one of the connector links 241 is depicted in FIG. 11 in order to minimize the clutter that would result if all the connector links 241 were included on that figure.

It must be understood that, in the embodiment 211 of the torque transmission system, the pins 243 serve a dual purpose in that they not only effect a pivotal connection between each transfer block 239 and the connector links 241 by which the load transfer blocks 239 are joined, but they are also utilized to effect the blocking and derailing modes, as will be hereinafter more fully explained.

Figure 11:
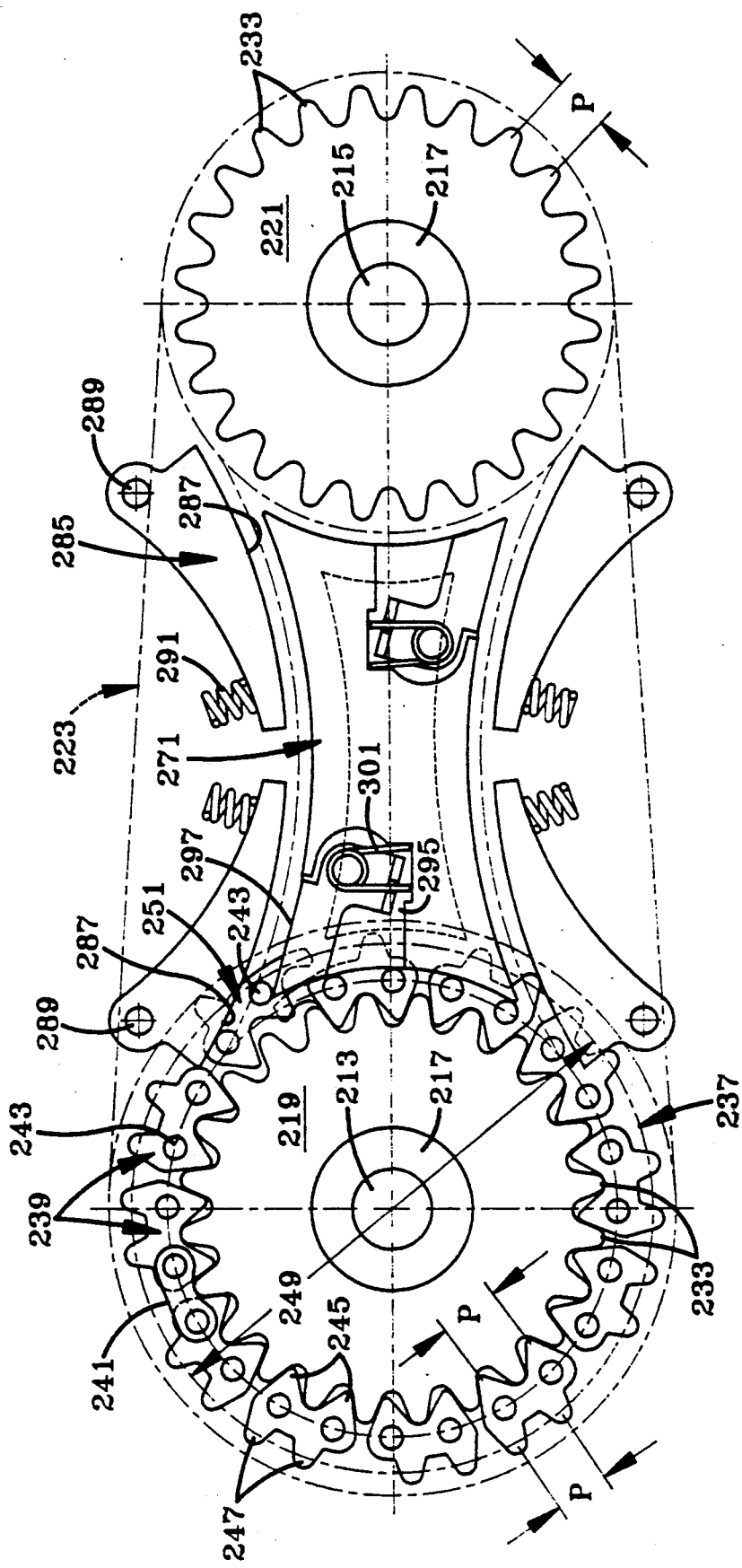
FIG. 11 is a schematic side elevation similar to FIG. 10, but depicting the system in the derailing mode, which permits the leading end of the traveling chain to disengage from the sprocket on the driving shaft, the traveling chain now being depicted in side elevation but the endless flexible torque transmitting means continues to be depicted in chain line.

As may most clearly be seen in FIG. 11, a pair of radially inwardly directed teeth 245 are presented from each load transfer block 239. The pitch dimension "P" for the teeth 245 must be equal to the pitch dimension "P" for the teeth 233 on each of the sprockets 219 and 221 to effect meshing engagement between each load transfer block 239 and either sprocket 219 or 221. As such, the length of the connector links 241 will be selected to permit the desired articulation between successive load transfer blocks 239 and also to assure that the successive load transfer blocks 239 mesh with the sprockets 219 and 221.

Continued reference to FIG. 11 reveals that each load transfer block 239 also presents a pair of outwardly directed cogs 247. The pitch dimension "P" between the successive cogs 247 on each insert load transfer block 239 is selected to be exactly equal to the pitch dimension "P" between the teeth 233 on each sprocket 219 and 221. As such, the cogs 247 on each insert load transfer block 239 will meshingly engage with the teeth 231 on the endless drive chain 223 as represented in FIG. 14.

However, it should be appreciated that when the traveling chain 237 is inserted between either sprocket 219 or 221 and the endless drive chain 223, that sprocket 219 or 221 will thereby have an increased effective pitch diameter 249 (FIG. 11). The increase in the pitch diameter is substantially equal to the thickness of the traveling chain 237. To accommodate for this difference in the effective pitch diameters 235 and 249 of the sprockets when the traveling chain 237 is circumscribed in whole or in part about one of the sprockets 219 or 221, the thickness of the traveling chain 237 may be judiciously selected such that the insert blocks 239 may effectively utilize nonsymmetrical placement of the cogs 247 to effect a nonbinding, torque transfer between the traveling chain 237 and the drive chain 223.

As best shown in FIG. 14, the nonsymmetrical placement of the cogs 247, if the dimensions are properly selected, permits successive insert load transfer blocks 239 to be reversed such that the successive insert load transfer present mirror images of each other. This arrangement allows all insert load transfer blocks 239 to be identical. As such, when the traveling chain 237 is interposed between either sprocket 219 or 221 and the endless drive chain 223, every fourth and fifth tooth 231 on the endless drive chain 223 will only be engaged by one cog 247, also as shown in FIG. 14.

In other words, because the cogs 247 mesh with the teeth 231 on the drive chain 223, the pitch dimension for the cogs 247 must also equal dimension "P". To provide the same pitch dimension on both sides of the traveling chain 237 the load transfer blocks 239 have an asymmetrical design; viz., the two cogs 247 on each load transfer block 239 are offset with respect to the center of each block 239. As such, when the traveling chain 237 circumscribes either sprocket 219 or 221, a fictitious cog wheel is presented wherein a cog is missing at predetermined circumferential locations. In the embodiment depicted in FIGS. 10-21, a fictitious thirty cog wheel results wherein every fifth cog is missing, yet the pitch dimension "P" is maintained between the cogs in each load transfer block 239.

Figure 17:
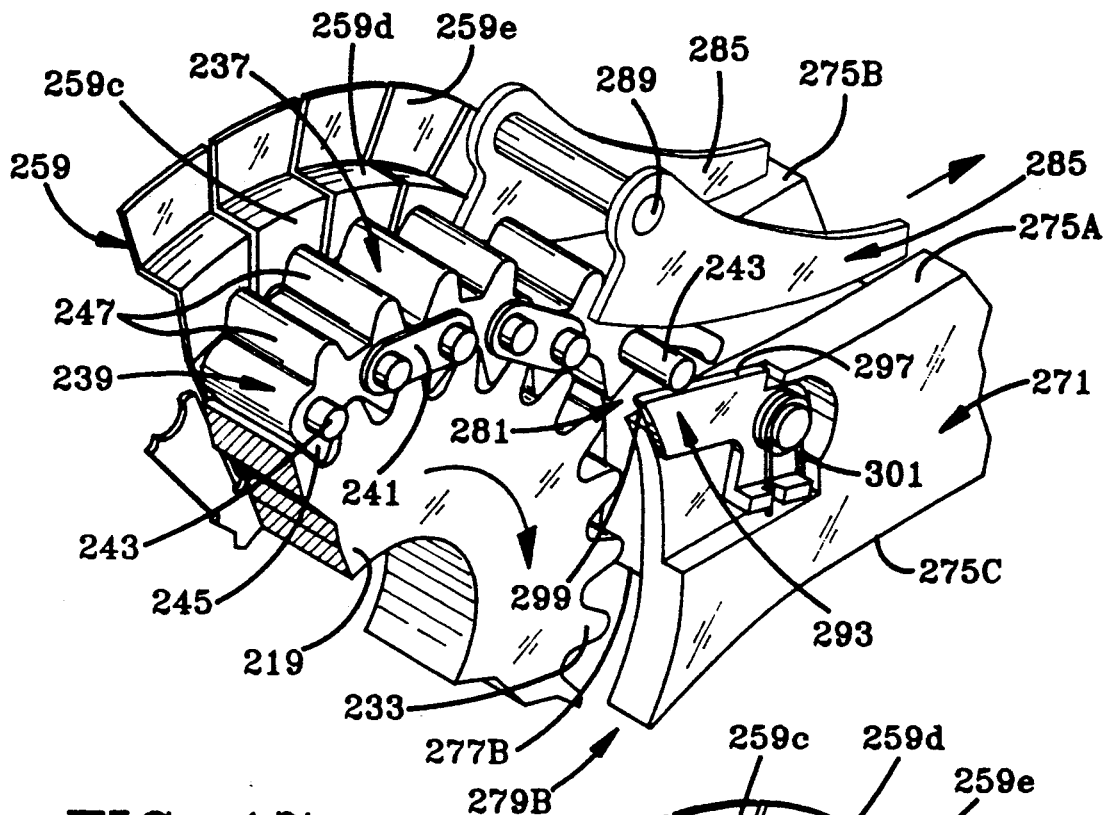
FIG. 17 is a perspective view of the mechanism depicted in side elevation in FIG. 16.

As best seen in FIGS. 14, 17 and 18, the traveling chain 237 also has a leading end block 251, which presents a tongue 253, and a trailing end block 255 (FIG. 14), which also presents a tongue 253. The leading and trailing end blocks 251 and 255 may also be identical. Hence, when the blocks 251 and 255 are disposed at opposite ends of the traveling chain 237 and are disposed in circumferential opposition, the tongues 253 on the leading and trailing end blocks 251 and 255 lie in adjacent juxtaposition. As will become apparent, the tongues 253 provide a smooth penetration of the traveling chain 237 to a position where it is interposed between the drive chain 223 and either sprocket 219 or 221, as well as a smooth exit as the traveling chain 237 leaves one sprocket for the other. The smooth penetration so provided assures a positive synchronous engagement of the traveling chain 237 with not only the drive chain 223 but also the sprockets 219 or 221.

In order to maintain the traveling chain 237 in operative, peripheral engagement with the sprocket 219 or 221, a containment means 257 (FIG. 14) is provided. The containment means 257 must act in concert with the insert load transfer blocks 239 and/or the reaction pins 243 presented from the traveling chain 237 to maintain the traveling chain 237 in operative engagement with whichever of the sprockets 219 or 221 about which it is received. An ejection means, as hereinafter more fully described, may be employed in association with the containment means 257 effectively to direct the leading end block 251 outwardly and away from the sprocket about which the traveling chain 237 is circumscribed.

The containment means 257 utilized with the alternative form of the torque transfer system 211, depicted in FIGS. 10 through 21, incorporates a resilient disk 259 (FIGS. 12 and 13) that is secured to at least one side of each sprocket 219 and 221. As shown, however, both sprockets 219 and 221 are embraced between resilient disks 259 in the nature of Belleville springs that are secured to opposite sides of each sprocket 219 and 221.

Figures 12, 13:
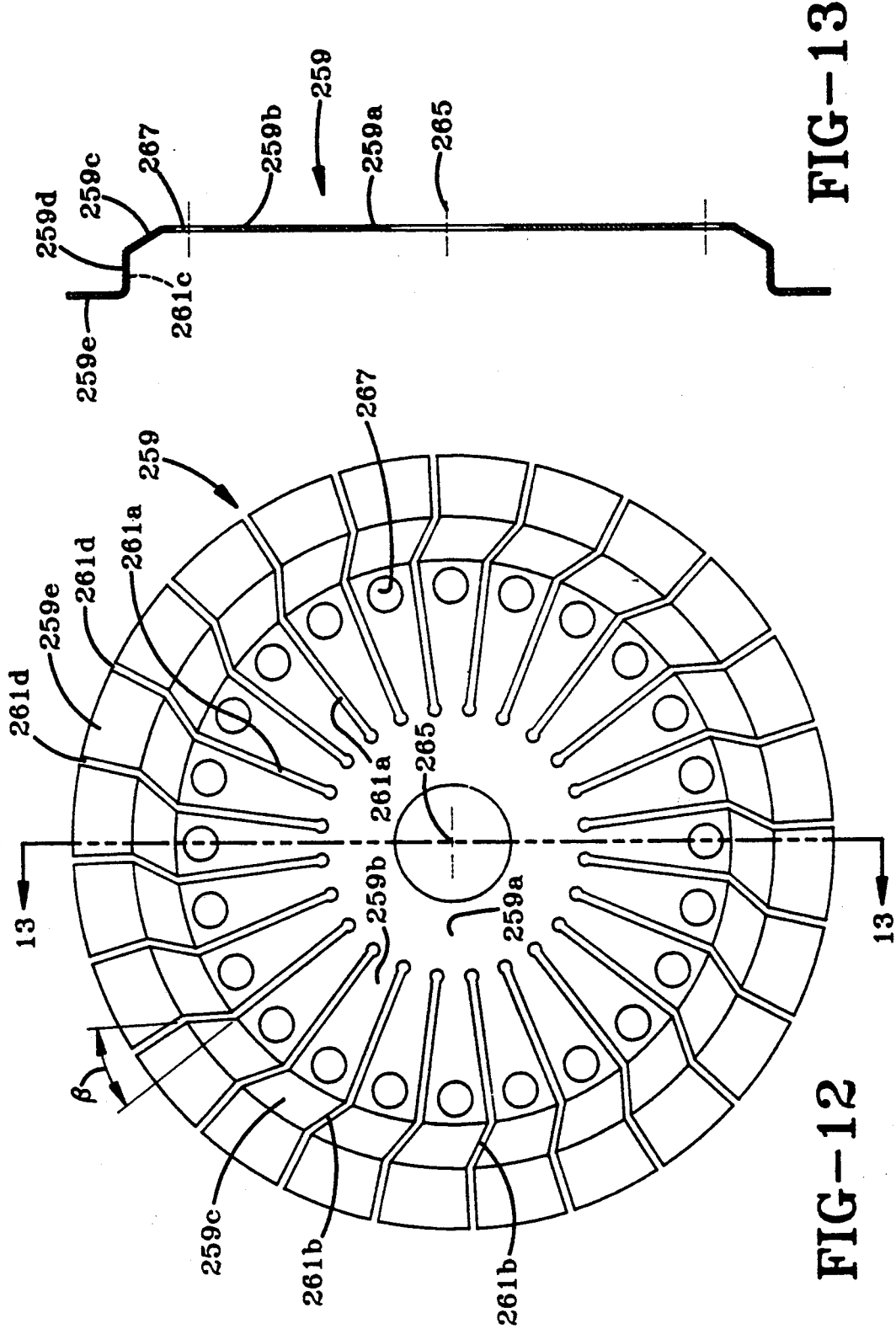
FIG. 12 is a side elevation of a resilient disk which serves as a key element in the containment means employed by the alternative configuration of the torque transmission system depicted.
FIG. 13 is a vertical cross section taken substantially along line 13—13 of FIG. 12.

FIG. 12 is an elevational view of one of the resilient disks 259. Each resilient disk 259 has a series of circumferentially spaced generally radially extending offset slots 261. Portion 261a of each slot 261 emanates from the generally planar central body portion 259a and extends radially outwardly to define a pie-shaped segment 259b between the portion 261a of each slot 261. Each portion 261b is inclined from a radial reference at a projected angle beta (FIG. 12) and each portion 261b extends between the circumferentially successive cam follower portions 259c. The cam follower portions 259c are inclined laterally with respect to the central body portions 259a and the coplanar segments 259b, as is best represented in FIG. 13.

The radially outermost extent of each cam follower portion 259c joins a laterally oriented extender portion 259d and the adjacent extender portions 259d are separated by portion 261c of the slot 261. The extender portions 259d compositely form a discontinuous annulus which is interrupted by the circumferentially spaced portions 261c of slot 261. Each portion 261c may lie within a radial plane which includes the rotational axis 265 of the disk 259. An end portion 259e extends radially outwardly from each extender portion 259d, and as such, the end portions 259e may lie in a plane that is substantially parallel to, but laterally offset from, the planar central portion 259a and the segments 259b. The outer end portions 259e are separated by a radially extending portion 261d of the slot 261.

A series of engaging apertures 267 are disposed in a circular disposition concentrically about the rotational axis 265 of the resilient disk, which is coincident with the rotational axis of each sprocket 219 and 221, and the apertures 267 are circumferentially spaced such that one aperture 267 is located in each segment 259b. The apertures 267 in the resilient disks 259 cooperate with the reaction pins 243 to serve as the containment means 257 and to retain the traveling chain 237 on one or the other of the sprockets 219 or 221. As will become apparent, the inclined portions 261b of the offset slot 261 are provided and oriented to prevent the reaction pins 243 from having to cross any of the slots 261, particularly as the ends of the pins 243 engage and slide along the cam follower 259c and the segment 259b of the resilient disk 259 during the process of moving to engage the apertures 267.

Referring again to FIG. 10, guide means 271 are employed to direct the traveling chain 237 between the laterally spaced sprockets 219 and 221. The guide means 271 employs a central frame block 273 that may be supported in any manner convenient to the environment in which the system 211 is employed. The lateral sides of the central frame block 273 presents tracks or guide rails 275 which are raised above and extend laterally along the recessed upper and lower surfaces 277A and 277B of the block 273, and which extend arcuately between the sprockets 219 and 221.

Figure 10:
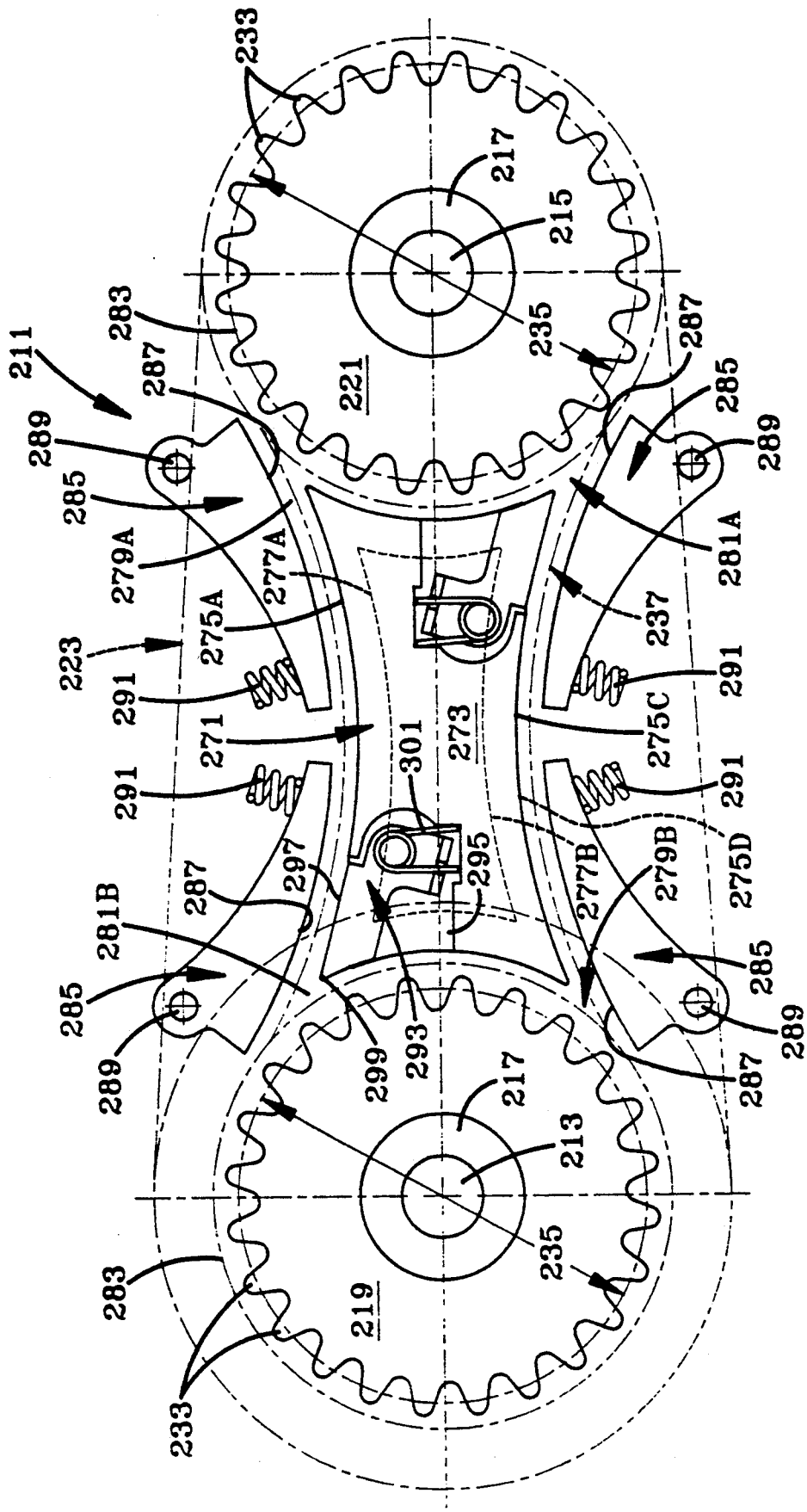
FIG. 10 is a schematic side elevation of an alternate form of a torque transmission system embodying the concepts of the present invention and depicting the insert band in the nature of a traveling chain circumscribing a wheel means in the nature of a sprocket attached to the driving shaft to provide the maximum overdrive gear ratio, the traveling chain being depicted in chain line, as is the endless flexible torque transmitting means which is operatively connected between the wheel means.

As is depicted in FIGS. 10 and 17, the central frame block 273 presents curved tracks 275A and 275B which are raised above and extend along the recessed upper surface 277A. Likewise, curved tracks 275C and 275D are raised above and extend along the recessed lower surface 277B. As such, the tracks 275 extend between the sprockets 219 and 221 to define the runs of the traveling chain 237. The opposite ends of each track 275 present ingress and egress spans 279 and 281 (FIG. 10) which are open, and communicate with, the paths along which the traveling chain 237 will move during a shift, as will be hereinafter more fully described.

It should be understood that when the interaction between the traveling chain 237 and the sprockets 219 and 221 is accomplished by teeth 245, as is the situation in torque transfer system 211, the tracks 275 must be arcuate to direct the traveling chain 237 away from the endless drive chain 223 during the movement of the traveling chain 237 as it transfers between the sprockets 219 and 221. In that regard, it has been found that the arc of each track 275 should preferably be tangent to the pitch circle 283 of each sprocket 219 or 221. Penetration of the traveling chain 237 along that tangent assists in the facile operation of the transmission system 211, as will also be hereinafter more fully explained.

Tensioners 285 are mounted in opposition to each track 275. Each tensioner 285 has an arcuate engaging surface 287 disposed in opposition to one of the tracks 275. Each tensioner 285 is pivotally mounted, as by a pivot pin 289, and is biased, as by the compression spring 291, such that the arcuate engaging surface 289 is biased toward but in generally spaced relation with respect to, the opposed track 275.

Ejectors 293 may also be employed. When provided, each ejector 293 will be received in a recess 295 formed adjacent and along the outside of each track 275 in proximity to the egress span 281. Each ejector 293 will have a directing surface 297 which terminates in an apex 299. The apex 299 is disposed in close proximity to and radially outwardly from the traveling chain 237 as that chain circumscribes either sprocket 219 or 221 while being retained thereon by the containment means 257; i.e., as shown at the interaction between the resilient disk 259 and the reaction pins 243. A coil spring 301 normally biases the ejector 293 such that the directing surface 297 is normally disposed to lie along the adjacent track 275.

However, in response to the application of any force to the apex 299 or the directing surface 297, the ejector 293 will pivot against the biasing action of the coil spring 301 to swing toward the adjacent sprocket 219 or 221 for a purpose that will shortly become apparent.

Figure 15:
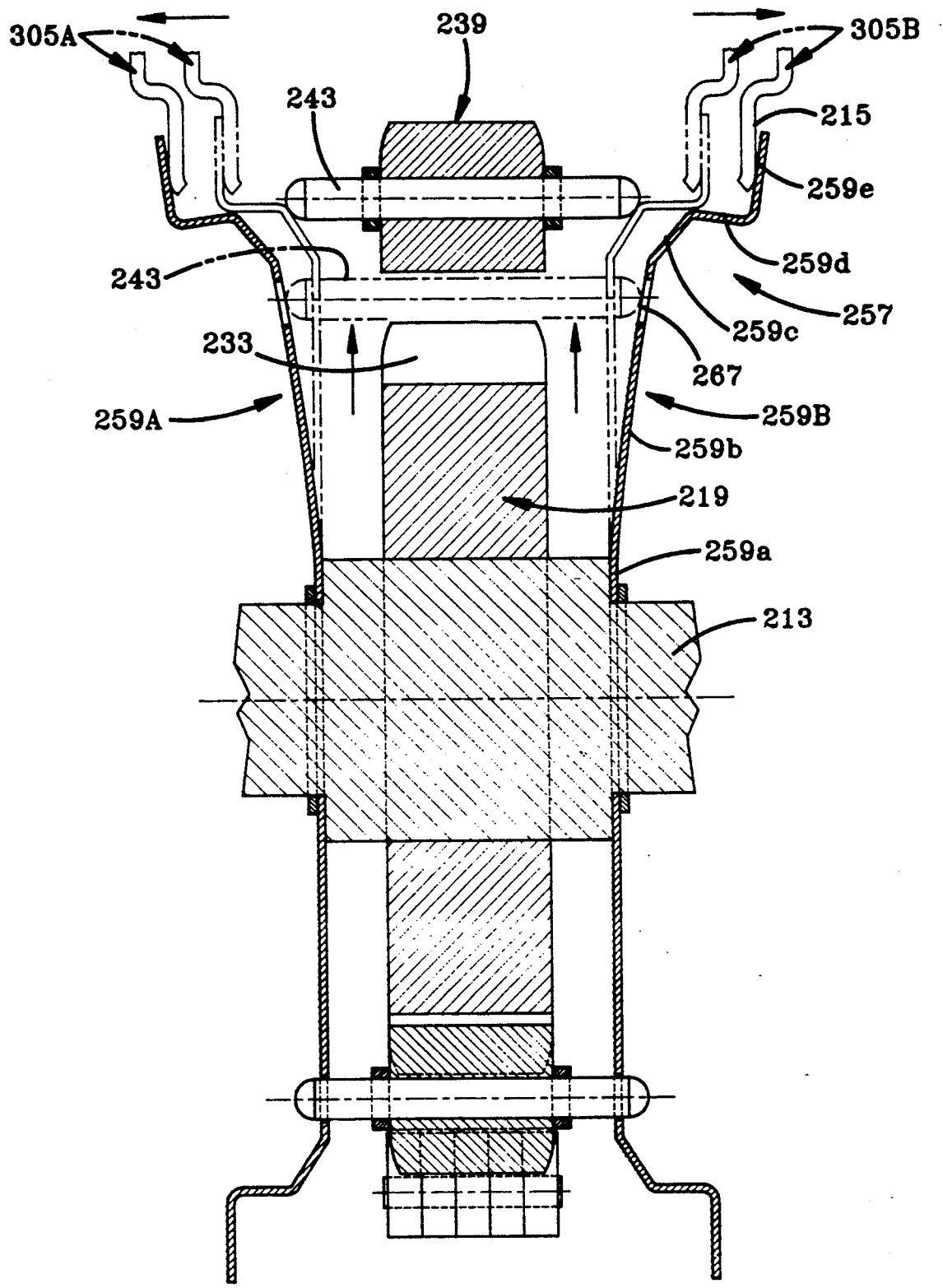
FIG. 15 is an enlarged vertical cross section taken substantially along line 15—15 of FIG. 14 depicting the interaction of the resilient disk and a reaction pin in not only the retaining mode, but also the derailing mode, and the converse thereof, the inserting mode.
Figure 19:
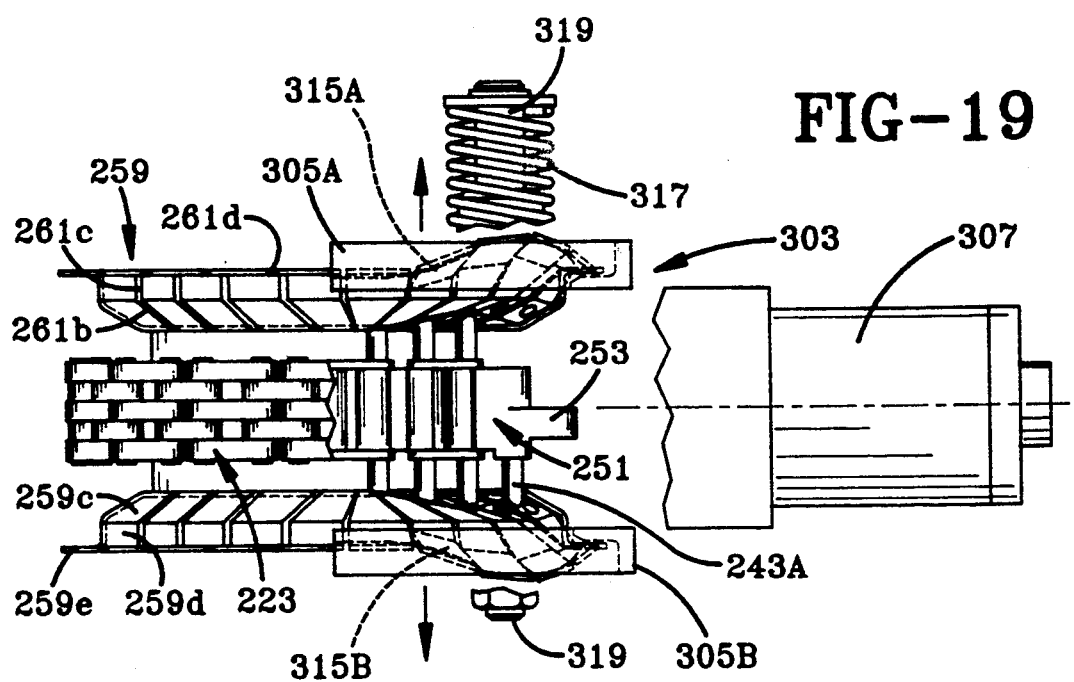
FIG. 19 is a top plan view, of reduced size, of the mechanism depicted in FIG. 16, but showing the interaction of the shift actuator with the resilient disks of the containment means as the initiation of the derailing mode.
Figure 20:
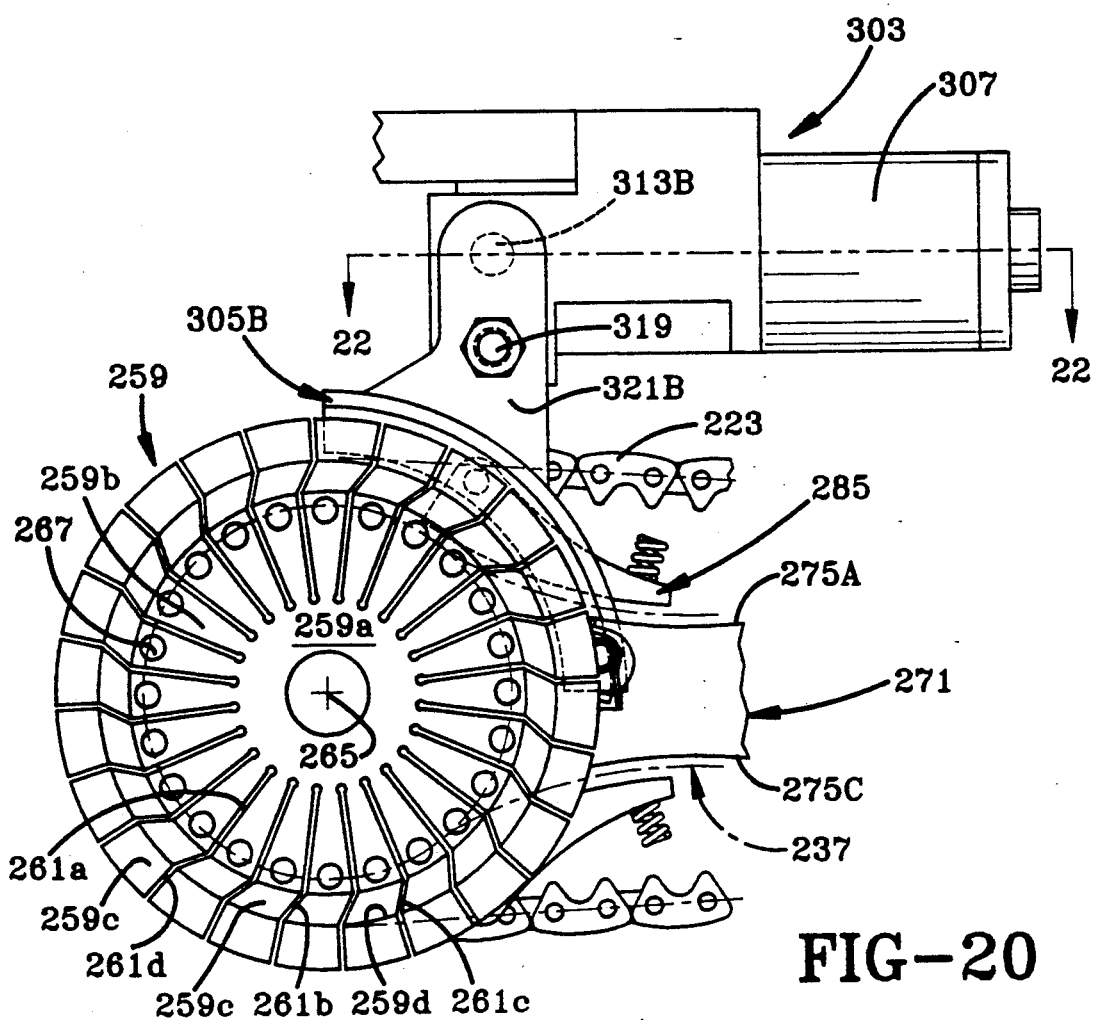
FIG. 20 is a side elevation of the mechanism depicted in FIG. 19.
Figure 21:
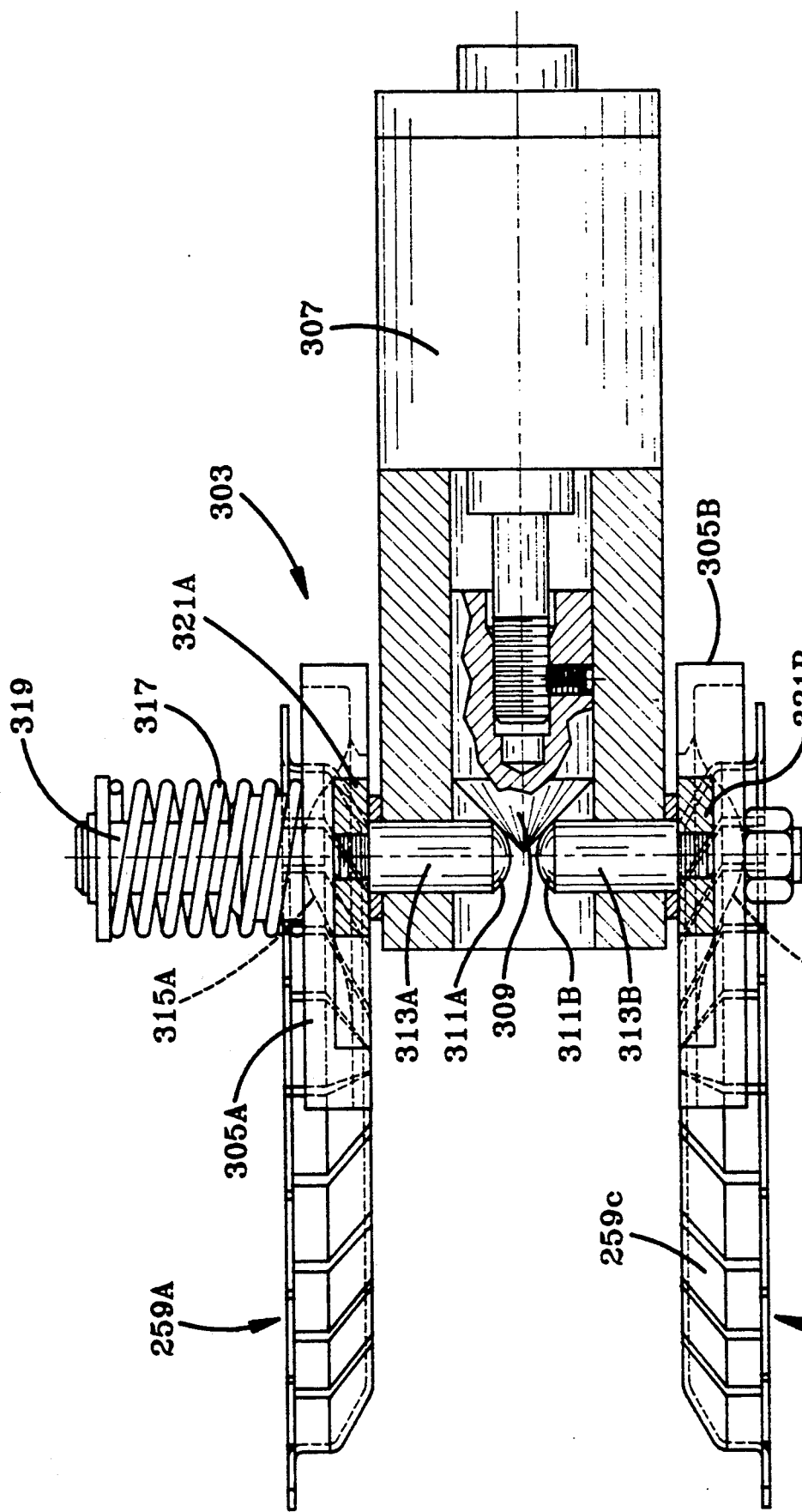
FIG. 21 is an enlarged cross section taken substantially along line 21—21 of FIG. 20.

A shift actuator 303, which is detailed in FIGS. 20-21 and which is associated with each sprocket 219 and 221, has a pair of spring biased shoes 305 which may be in the general configuration of quadrant plates that selectively translate laterally (as represented in FIG. 15) to engage the radially outer end portions 259e of the resilient disks 259 associated with the sprocket about which the traveling chain 237 is circumscribed. The shoes 305 are biased by a compression spring 317 which acts upon a biasing shaft 319 that coacts with the mounting arms 321A and 321B for the respective shoes 305A and 305B. The compression spring 317 thus acts to maintain the shoes 305A and 305B out of engagement with the resilient disk 259, as best seen in FIGS. 19 and 21. However, the shoes 305 may, as shown, be translated against the biasing action of spring 317 by operation of a fluid cylinder 307 which reciprocates a conical head 309 that engages the inboard end 311 of each actuating pin 313 which is also presented from the mounting arms 321.

Figure 16:
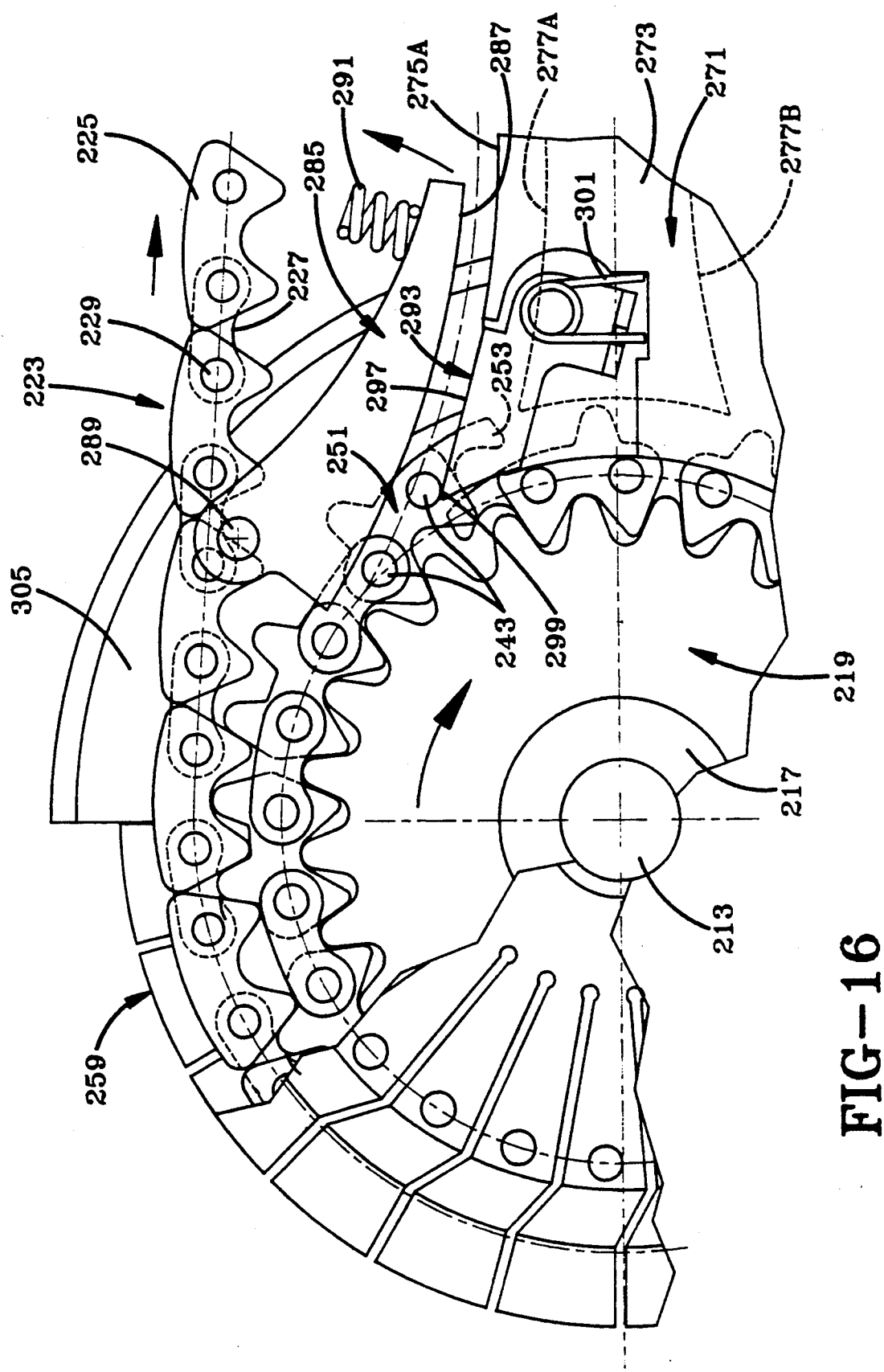
FIG. 16 is an enlarged area of FIG. 14 depicting the interaction of the leading end block with an ejector and an opposed tensioner at the initiation of the derailing mode.

In view of the detailed description relating to the operation of that embodiment of the torque transfer system 10 depicted in FIGS. 1-9 previously provided herein, one can readily understand the operation of the embodiment 211 depicted in FIGS. 10-21 by an explanation, not only as to the initiation of the shift, as depicted in FIGS. 14, 16 and 17, but also as to the penetration depicted in FIG. 18. With the traveling chain 237 circumscribing the sprocket 219 affixed to the driving shaft 213, the system 211 is in the maximum overdrive ratio.

To shift into the maximum underdrive ratio, the fluid cylinder 307 is actuated to drive the conical head 309 outwardly into engagement with the inboard ends 311 of the support pins 313, thus driving the pins 313 apart and thereby forcing the bulbous camming surfaces 315A and 315B presented from the shoes 305A and 305B into engagement with the outer end portions 259e of the resilient disks 259A and 259B secured to the sprocket 219. This movement causes those segments 259b which are directly connected to the outer end portions 259e that are engaged by the camming surface 315 on the shoes 305 to flex laterally apart, as shown in FIG. 15, and thereby release the reaction pins 243 from the apertures 267 within which they are received.

When the reaction pin 243A, presented from the leading end block 251 of the traveling chain 237 is thus released, centrifugal force will tend to throw the tongue 253 on the leading end block 251 radially outwardly. Radial displacement of the tongue 253 on the leading end block 251 will cause the reaction pin 342A to engage the apex 299, and sequentially thereafter the directing surface 297 on the ejector 293 (FIG. 11), such that the traveling chain 237 will pass through the egress span 281B to engage, and move along, the track 275A.

It will be noted that the torque transfer system 211 may satisfactorily operate without the use of an ejector 293. However, in order to be certain of derailment at the slowest rotational speed of the sprocket upon which the traveling chain 237 is circumscribed, an ejector 293 may be employed to translate the slightest displacement of the tongue 253, and thus the reaction pin 243A, on the leading end block 251 into the desired initiation of a shift.

Irrespective of whether or not an ejector 293 is employed, once the leading end block 251 passes through the egress span 281B, rotation of the remaining portion of the traveling chain 237 on the sprocket 219 will force the leading end block 251 along the tracks 275A and 275B until the trailing end block 255 of the traveling chain 237 is released. The lineal length of the traveling chain 237 is such that when the trailing end block 255 leaves sprocket 219, the leading end block 251 will already have passed through the ingress span 279A to engage the teeth 233 on the sprocket 221.

Because the total length of the traveling chain 237 is fixed, as a general rule the length of the tracks 275 are approximately one-half the circumference of either sprocket 219 or 221. The center distance between sprockets, as well as the pitch radii of the those sprockets, are concomitantly selected to assure that during a shift the traveling chain 237 will have engaged one sprocket before having totally disengaged from the other sprocket, and more importantly, to assure that the endless chain 223 is neither slackened nor over-tightened during the shift.

Referring to FIG. 18, when the tongue 253 on the leading end block 251 of the traveling chain 237 is positioned to wedge between the teeth 233 of sprocket 221 and the teeth 231 of the drive chain 223, The reaction pin 243A projecting from one side of the tongue 253 on the leading end block 251 will engage the respective inclined cam follower 259c of the respective disk segment 259b happens to be aligned with the ingress span 279.

As the leading end block 251 is captured between the endless drive chain 223 and the sprocket 221, the reaction pin 243A, and the successive reaction pins 243, will each engage successive cam followers 259c in the resilient disk 259. Such captured engagement, coupled with the continued rotation of the sprocket 221, will flex the segments 259b directly connected to the cam followers 259c until the initial, and successive, reaction pins 243 enter the appropriate apertures 267. This entry allows the disk segments 259b to spring back to their normal position, whereupon the traveling chain 237 will begin to circumscribe and be contained on the sprocket 221.

It should be noted that by employing the canted portion 261b of the slot 261, none of the reaction pins 243 will attempt to enter any slot 261, but rather each reaction pin 243 will slide along one cam follower 259c, and the segment 259b directly associated therewith, until each successive reaction pin 243 aligns with and enters an aperture 267.

A kinematic study will reveal that there is a change in the length of the path of the traveling chain 237 during the transition from one sprocket to the other. The tensioners 285 are provided to absorb this dynamic change in the length of the path of the traveling chain 237 during the transition from one sprocket to the other. Thus, at the moment, when the length of the traveling chain path is shortened, as results when the traveling chain 237 begins to circumscribe itself about the sprocket which is rotating at a higher rotational velocity, as does the sprocket on the driven shaft in the overdrive situation, the tensioners 285 will move outwardly away from the tracks 275 to effect an accommodation for the apparent, momentary change in the length of the traveling chain path during the shift.

With the traveling chain 237 having been moved from sprocket 219 to sprocket 221, a shift from the maximum underdrive to the maximum overdrive ratio will have been accomplished. In order to provide proper mating of the traveling chain 237 with the teeth 233 of sprocket 219 or 221, the leading end block 251, and the tongue 253 presented therefrom, must approach the pitch circle 283 of each sprocket 219 or 221 tangentially. This is accomplished by the angular disposition of the arcuate track 275 as it terminates in tangential alignment with the pitch circle 283.

When it is desired to shift speeds and return the traveling chain 237 to the sprocket 219, the shifting operation is reversed, but that shift is accomplished in the same manner heretofore described.

The configuration of the traveling chain 237 in the torque transmission system 211 and its interaction with the drive chain 223 and the sprockets 219 and 221 not only has the advantage of providing a solid design with noise reduction but also an automatic derailing system that eliminates the need for gates.

The novel chain drive system provides a highly efficient power transfer device having minimal power loss, minimal friction loss and high efficiency when shifting between the two speed ratios. These favorable aspects result from the absence of shift clutches and meshing gears, as well as the minimal number of bearings and rotating components. Moreover, the invention is adapted for use in any situation where a chain or gear drive connects two parallel shafts.

By combining two or more of the improved systems in series, transmissions with speed ratios of four or more can be made. For example, an eight speed transmission can be designed by combining three of the traveling chain systems in series.

Another typical application may be to shift speed ratios when an engine operates an accessory device, such as a fan or an air conditioning compressor, and the idling speed is lower than desired for that purpose, the chain or belt drive shift would provide for one speed ratio when the engine is idling and a different speed ratio as the engine speed is increased.

As should now be apparent, the present invention not only teaches that a torque transmission system embodying the concepts of the present invention provides a shift between two predetermined drive ratios but also that the other objects of the invention can likewise be accomplished.

The embodiments of the invention in which an exclusive property or privilege is claimed are defined as follows:

1. A torque transmission system for operatively connecting laterally spaced driving and driven shaft means, said system comprising:
   a first wheel means mounted on the driving shaft means;
   a second wheel means mounted on the driven shaft means;
   each said wheel means having substantially identical pitch diameters;
   an endless flexible torque transmitting means operatively connecting said first and second wheel means;
   a traveling insert band means to circumscribe and operatively to engage one of said wheel means at a time and to be located radially inwardly of said endless flexible torque transmitting means;
   said traveling insert band means having leading and trailing ends located in substantially circumferential opposition when said traveling insert band means operatively engages said wheel means;
   means selectively to derail said leading end of said traveling insert band means from said wheel means;
   said traveling insert band means adapted when its leading end is derailed from one of said wheel means to travel to the other said wheel means and to circumscribe and operatively engage said other pulley means radially inwardly of said endless torque transmitting means thereby providing a different speed ratio between said driving and driven shafts.

2. A torque transmission system, as set forth in claim 1, further comprising:
   means selectively to contain said traveling insert band means on the desired wheel means.

3. A torque transmission system, as set forth in claim 2, further comprising:
   ejector means to direct said insert band toward either of said wheel means when said insert band has been derailed from other of said wheel means.

4. A torque transmission system, as set forth in claim 3, further comprising:
   a reaction pin projecting laterally from said insert band in proximity to the leading end thereof;
   said reaction pin cooperatively interacting with said ejector means selectively to derail the leading end of said insert band.

5. A torque transmission system for operatively connecting laterally spaced driving and driven shaft means, said system comprising:
   a sprocket mounted on each said shaft;
   each said sprocket having radially extending teeth located along the circumference thereof;
   an endless flexible chain which cooperatively interacts with said teeth on said sprockets;
   a traveling chain adapted cooperatively to interact with said teeth on either of said sprockets and having cogs which cooperatively interact with the endless flexible chain along that portion of said traveling chain which engages the teeth on either said sprocket;
   said traveling chain having a leading end and a trailing end which define the length of said traveling chain such that it will substantially circumscribe either of said sprockets; and
   means being provided for selectively disengaging the leading end of said traveling chain from whichever of said sprockets is circumscribed by said traveling chain during driving movement of said endless chain.

6. A torque transmission system, as set forth in claim 5, further comprising:
   track means to direct said traveling chain toward either of said sprockets when said traveling chain has been derailed from other of said sprockets.

7. A torque transmission system, as set forth in claim 6, further comprising:
   ejector means to direct said leading end of said traveling chain outwardly and away from the sprocket about which said traveling chain is circumscribed when said reaction pin in the leading end of said traveling chain is released.

8. A torque transmission system, as set forth in claim 6, further comprising:
   tongue means on at least the leading end of said traveling chain to facilitate meshing engagement between the cogs on said traveling chain and said endless chain as well as the teeth on either of said sprockets.

* * * * *